(12) United States Patent  
Gorroño et al.

(10) Patent No.: US 12,118,488 B2  
(45) Date of Patent: Oct. 15, 2024

(54) AUTOMATED CODE GENERATION FOR DATA TRANSFORMATIONS IN A WORKFLOW

(71) Applicant: Microsoft Technology Licensing, LLC, Redmond, WA (US)

(72) Inventors: José Luis Fernández Gorroño, Paris (FR); Cédric Thierry Michel Bignon, Clamart (FR); Cédric Bernard Jean Golmard, Plaisir (FR); Nicolas Chao Wei Ding, Issy-les-Moulineaux (FR); Anand Mourouguessin, Bezons (FR); Lydia Jo Bagwell, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 291 days.

(21) Appl. No.: 17/844,432

(22) Filed: Jun. 20, 2022

(65) Prior Publication Data

US 2023/0334395 A1    Oct. 19, 2023

Related U.S. Application Data

(60) Provisional application No. 63/330,859, filed on Apr. 14, 2022.

(51) Int. Cl.
*G06F 9/54* (2006.01)
*G06F 3/0482* (2013.01)
(Continued)

(52) U.S. Cl.
CPC ..... *G06Q 10/06316* (2013.01); *G06F 3/0482* (2013.01); *G06F 8/51* (2013.01);
(Continued)

(58) Field of Classification Search
CPC ......... G06Q 10/06316; G06Q 10/0633; G06F 3/0482; G06F 8/51; G06F 8/34; G06F 8/36
See application file for complete search history.

(56) References Cited

U.S. PATENT DOCUMENTS 10,528,328 B2    1/2020   Singh
10,698,571 B2    6/2020   Gulwani et al.
(Continued)

OTHER PUBLICATIONS

Andras Balogh et al., Workflow-Driven Tool Integration Using Model Transformations,, 2010, [Retrieved on Apr. 30, 2024]. Retrieved from the internet: <URL: https://d1wqtxts1xzle7.cloudfront.net/43920189/Workflow-Driven_Tool_Integration_Using_M20160320-27508-1j5r817-libre.pdf?> 25 Pages (224-248) (Year: 2010).*

(Continued)

*Primary Examiner* — Anibal Rivera
(74) *Attorney, Agent, or Firm* — Weaver IP L.L.C.

(57) ABSTRACT

Methods, systems, and computer program products are described herein for implementing a workflow development system that includes automatic code generation for data transformations. For instance, the workflow development system may provide a graphical user interface that enables a user to add and/or configure one or more workflow steps. At least one workflow step may be configured to perform a transformation or re-formatting of data that may be received from a previous workflow step. The code utilized to perform the transformation or re-formatting may be automatically determined by the workflow development system in accordance with programming-by-example techniques, where a user provides sample input data representative of the data prior to transformation and provides sample output data representative of data post-transformation. The workflow development system learns and/or generates code, that is
(Continued)

able to perform the transformation as desired by the user, based on the sample input and output data.

20 Claims, 17 Drawing Sheets

(51) Int. Cl.
*G06F 8/51* (2018.01)
*G06F 9/38* (2018.01)
*G06Q 10/06* (2023.01)
*G06Q 10/0631* (2023.01)
*G06F 8/34* (2018.01)
*G06F 8/36* (2018.01)
*G06Q 10/0633* (2023.01)

(52) U.S. Cl.
CPC ............... *G06F 8/34* (2013.01); *G06F 8/36* (2013.01); *G06Q 10/0633* (2013.01)

(56) References Cited

U.S. PATENT DOCUMENTS

| | | | |
|---|---|---|---|
| 10,831,451 B2 | 11/2020 | Udupa et al. | |
| 11,256,710 B2 | 2/2022 | Gulwani et al. | |
| 2017/0161027 A1 | 6/2017 | Singh | |
| 2017/0315714 A1 | 11/2017 | Shyamsundar et al. | |
| 2017/0316355 A1* | 11/2017 | Shrestha | G06Q 10/067 |
| 2018/0285476 A1 | 10/2018 | Siciliano et al. | |
| 2020/0319856 A1 | 10/2020 | Loria | |
| 2021/0034439 A1* | 2/2021 | Vaishnav | G06F 11/3688 |
| 2021/0248492 A1 | 8/2021 | Odena et al. | |

OTHER PUBLICATIONS

Guibert, et al., "Example-Based Programming: A Pertinent Visual Approach for Learning to Program", In Proceedings of the Working Conference on Advanced Visual Interfaces, May 25, 2004, pp. 358-361.

Shu, et al., "Neural Programming by Example", In Repository of arXiv:1703.04990v1, Mar. 15, 2017, 7 Pages.

"Prose", Retrieved from: https://web.archive.org/web/20220105162155/https://www.microsoft.com/en-us/research/group/prose/, Jan. 5, 2022, 4 Pages.

"International Search Report and Written Opinion Issued in PCT Application No. PCT/US23/011801", Mailed Date: May 2, 2023, 14 Pages.

\* cited by examiner

AUTOMATED CODE GENERATION FOR DATA TRANSFORMATIONS IN A WORKFLOW

CROSS-REFERENCE TO RELATED APPLICATION(S)

This application claims priority to U.S. Provisional Patent Application No. 63/330,859 entitled "AUTOMATED CODE GENERATION FOR DATA TRANSFORMATIONS IN A WORKFLOW," and filed on Apr. 14, 2022, the entirety of which is incorporated by reference herein.

BACKGROUND

A software application is a computer program used by end users to perform various functions. Internal to an organization, software applications are frequently developed when available off-the-shelf software does not completely address the desired functionality. Many applications are interactive, having a graphical user interface (GUI) via which users can input data, submit data queries, perform operations, and view results.

Certain users (e.g., organizational users) tend to depend on information technology (IT) personnel to code their applications due to application complexity, and the programming expertise required. For example, merely designing an application to retrieve data from a remote source (e.g., a cloud service) is difficult, typically requiring the involvement of an experienced software developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are described herein for implementing a workflow development system that includes automatic code generation for data transformations. For instance, the workflow development system may provide a graphical user interface that enables a user to add and/or configure one or more workflow steps. At least one workflow step may be configured to perform a transformation or re-formatting of data that may be received from a previous workflow step. The code utilized to perform the transformation or re-formatting may be automatically determined by the workflow development system in accordance with programming-by-example techniques, where a user provides sample input data representative of the data prior to transformation and provides sample output data representative of data post-transformation. The workflow development system learns and/or generates code, that is able to perform the transformation as desired by the user, based on the sample input and output data.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
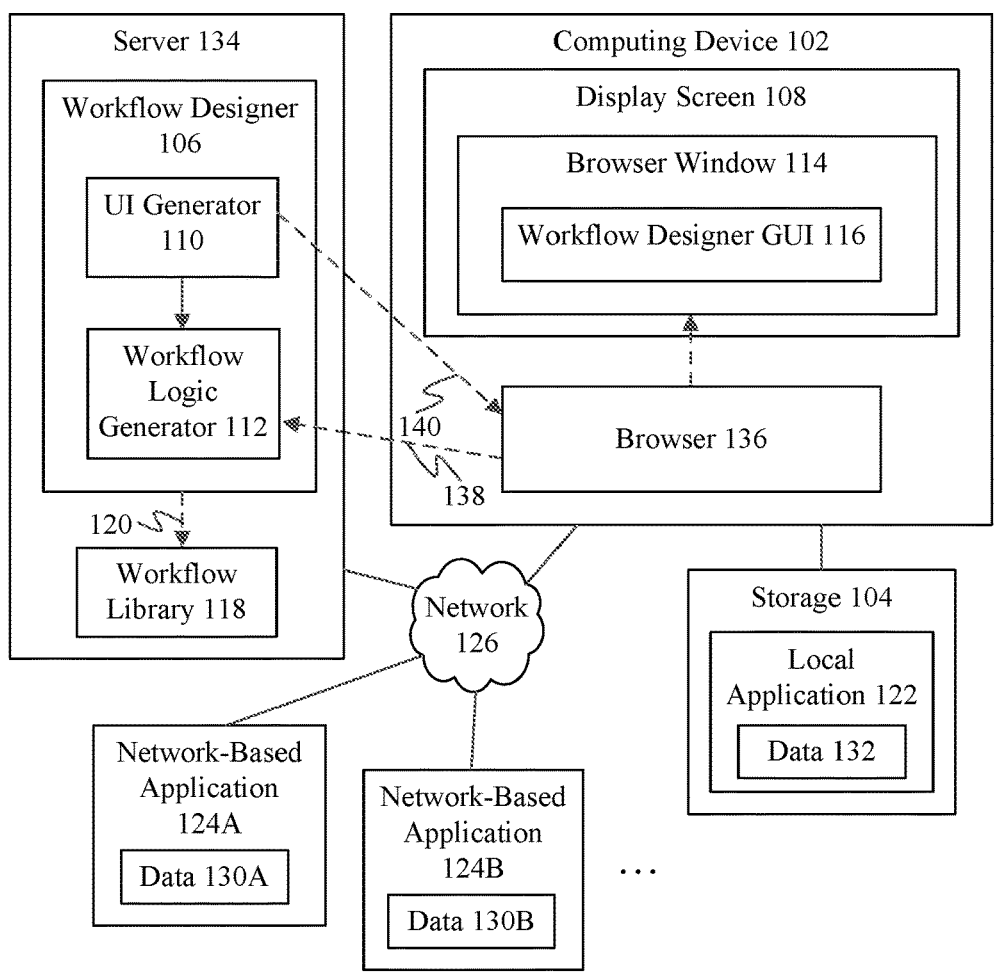
FIG. 1 is a block diagram of a workflow development system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Development of Workflows that Include Automatic Code Generation for Data Transformations

A. Example Workflow Development System Embodiments

Embodiments are described herein for implementing a workflow development system that includes automatic code generation for data transformations. For instance, the workflow development system may provide a graphical user interface that enables a user to add and/or configure one or more workflow steps. At least one workflow step may be configured to perform a transformation or re-formatting of data that may be received from a previous workflow step. The code utilized to perform the transformation or re-formatting may be automatically determined by the workflow development system in accordance with programming-by-example techniques, where a user provides sample input data representative of the data prior to transformation and provides sample output data representative of data post-transformation. The workflow development system learns and/or generates code, that is able to perform the transformation as desired by the user, based on the sample input and output data.

Today, users that build low-code, no-code automation-based applications via automation platforms need to use spreadsheet-like formulas or specific actions to change the format of data involved in their automations. For example, if a user wants to change the format of a date from 3/17/2022 to 17 Mar. 2022, the user will need to write a formula, which is not easy for a user without a software development background. Accordingly, such users may inadvertently introduce programming errors or bugs into the application, which can affect the computing device or system on which such applications execute. For example, such bugs may cause the device or system to incur an unnecessary expenditure of compute resource(s) (e.g., processing cycles, memory, storage, power, etc.) or even cause a device or system to crash. The techniques described herein prevent such disastrous scenarios, as the workflow development system automatically learns and/or generates the code on behalf of the user, and thus avoids programming errors.

Development of workflows may be enabled in various ways in embodiments. For instance, FIG. 1 is a block diagram of a workflow development system 100, according to an example embodiment. As shown in FIG. 1, system 100 includes a computing device 102, storage 104, a first network-based application 124A, a second network-based application 124B, and a server 134. Server 134 includes a workflow designer 106 and a workflow library 118 (e.g., in storage). Workflow designer 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to workflows created by workflow designer 106 during runtime of those workflows. Local application 122 may be any type of local application/service, such as a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application. Although FIG. 1 shows a single local application, any number of local applications may be present at computing device 102, including numbers in the tens, hundreds, or greater numbers.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to workflows created by workflow designer 106 during runtime of those workflows. Network-based applications 124A and 124B may each be any type of web accessible applications/services, such as database applications, collaborative document management and storage system applications, social networking applications, messaging applications, financial services applications, news applications, search applications, web-accessible productivity applications, cloud storage and/file hosting applications, etc. Examples of such applications include a web-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365, Dropbox™, Microsoft SharePoint™, etc. Although FIG. 1 shows two network-based applications, any number of network-based applications may be accessible over network 126, including numbers in the tens, hundreds, thousands, or greater numbers.

Note that data 130A, data 130B, and data 132 may each include any type of data, including messages, notifications, calculated data, retrieved data, and/or any other type of information requested or usable by a workflow.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow designer 106 is configured to be operated/interacted with to create workflows. For instance, a developer may access workflow designer 106 by interacting with an application at computing device 102 capable of accessing a network-based application, such as browser 136. The developer may use browser 136 to traverse a network address (e.g., a uniform resource locator) to workflow designer 106, which invokes a workflow designer GUI 116 (e.g., a web page) in a browser window 114. The developer is enabled to interact with workflow designer GUI 116 to develop a workflow. An example of workflow designer 106 includes, but is not limited to, Microsoft® Power Automate™.

As shown in FIG. 1, workflow designer 106 includes UI generator 110 and workflow logic generator 112. UI generator 110 is configured to transmit workflow GUI information 140 (e.g., one or more web pages, image content, etc.) to browser 136 to be displayed as workflow designer GUI 116 in display screen 108 in browser window 114. Workflow designer GUI 116 may be interacted with by the developer to select and configure workflow steps into a workflow. For example, the developer may insert and sequence a plurality of workflow steps in workflow designer GUI 116, with one or more of the steps being associated with a local or network-based application. In an embodiment, one or more of the steps may be configured to perform a data transform, where certain data may be transformed, reformatted, and/or re-shaped from one format to another format. The workflow step may utilize a programming-by-example (PBE)-based technique to determine the new format in which the data is to be formatted. In particular, the workflow step may enable the user to provide a set of one or more input examples, which are indicative of an output that should be achieved to comply with a user determined result. The workflow step (or workflow designer 106) analyzes the set of input examples to identity one or more logical patterns that are common to the set of input examples. The workflow step (or workflow designer 106) generates code or one or more expressions (e.g., executable program code, function calls, regular expressions, etc.) that will output the user determined result based on the logical pattern(s) that are consistent with the user input examples. Additional details regarding this technique are described below. Browser 136 stores the selected workflow steps, corresponding configuration information, and workflow step sequence information as constructed workflow information 138. Constructed workflow information 138 is transmitted to workflow logic generator 112 at server 134. Workflow logic generator 112 generates workflow logic 120 based on the assembled workflow represented by constructed workflow information 138. The workflow represented by workflow logic 120 may subsequently be invoked at runtime by an end user.

During runtime of the workflow, workflow logic 120 may invoke operation of one or more local or network-based applications associated with the workflow steps of workflow logic 120. Each workflow step may receive input data from or transmit output data to the one or more local or network-based applications. Such input or output data may include, for example, input data 132 received from or sent to local application 122, data 130A received from or sent to network-based application 124, data 130B received from or sent to network-based application 124B, etc.

Figure 3:
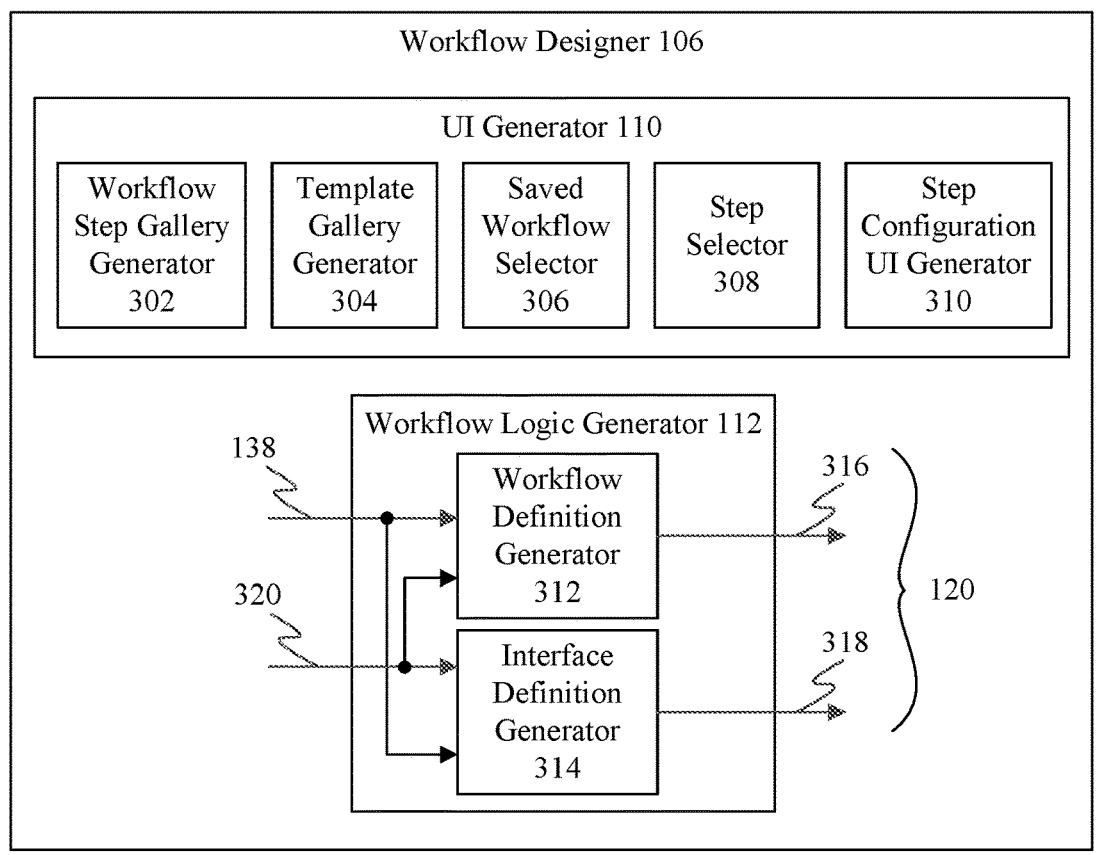
FIG. 3 is a block diagram of a workflow designer application, according to an example embodiment.
Figure 4:
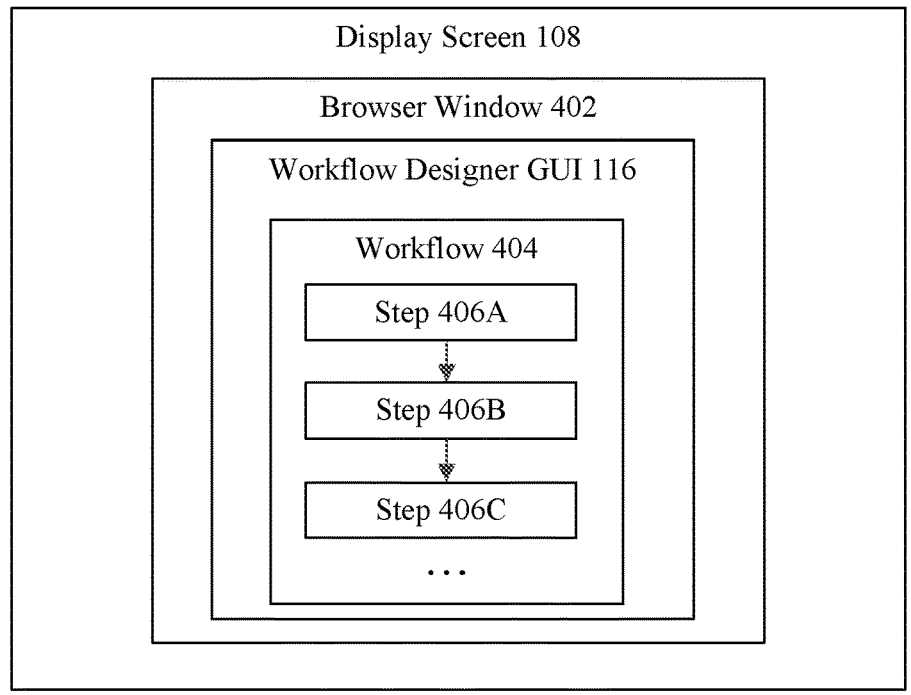
FIG. 4 is a block diagram of a display screen showing a browser window displaying an exemplary workflow, according to an example embodiment.

Workflow designer 106 may operate in various ways, to enable development of a workflow. For instance, in embodiments, workflow designer 106 may operate in accordance with flowchart 200 of FIG. 2. In particular, flowchart 200 depicts a process for development of workflows, according to an example embodiment. Flowchart 200 and workflow designer 106 are described as follows with respect to FIGS. 3 and 4. FIG. 3 is a block diagram of workflow designer 106, according to an example embodiment. As shown in FIG. 3, workflow designer 106 includes UI generator 110 and workflow logic generator 112. UI generator 110 includes a workflow step gallery generator 302, a template gallery generator 304, a saved workflow selector 306, a step selector 308, and a step configuration UI generator 310. Workflow logic generator 112 includes a workflow definition generator 312 and an interface definition generator 314. FIG. 4 is a block diagram of display screen 108, illustrating an example of workflow designer GUI 116 displayed in browser window 402 on display screen 108, according to an example embodiment.

Figure 2:
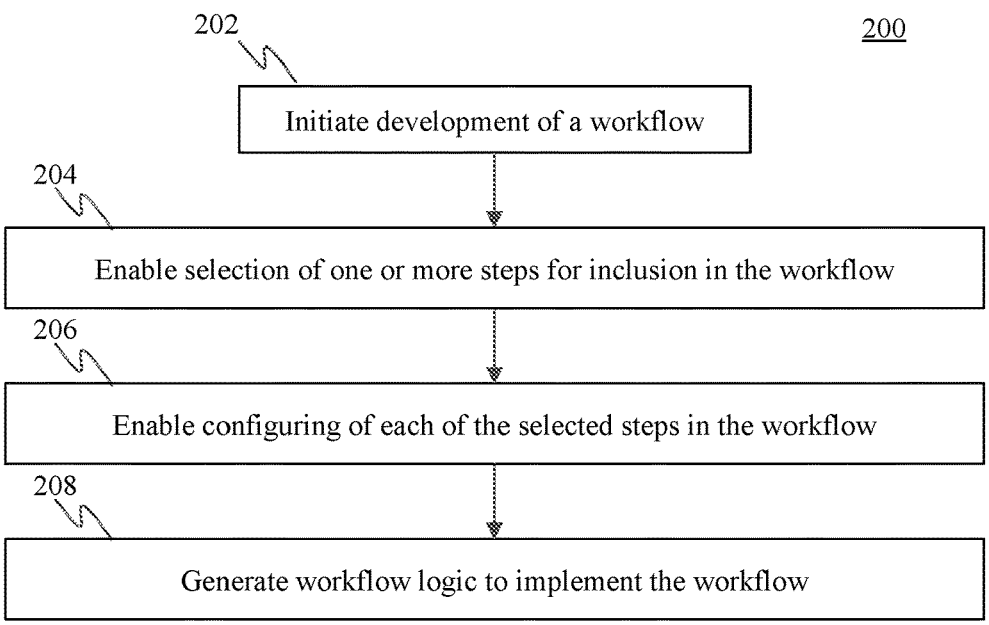
FIG. 2 depicts a flowchart of a process for development of workflows, according to an example embodiment.

Flowchart 200 of FIG. 2 begins with step 202. In step 202, development of a workflow is initiated. For example, in an embodiment, workflow designer 106 may be invoked by a developer interacting with browser 136 at computing device 102. The developer may traverse a link or other network address directed to workflow designer 106 at server 134, to invoke workflow designer 106, causing workflow designer 106 to provide workflow GUI information 140 (e.g., one or more web pages, image content, etc.) to browser 136 to be displayed as workflow designer GUI 116 in display screen 108 in browser window 114. Once invoked, the developer may open an existing workflow for further development, or may begin a new workflow.

For instance, a displayed page of workflow designer GUI 116 may display a gallery or workflow steps generated by workflow step gallery generator 302. The workflow step gallery includes a plurality of selectable workflow steps. The workflow steps may be stored in workflow library 118, and accessed for display by workflow designer GUI 116. The developer may select one of the workflow steps for inclusion in their workflow, and may proceed with configuring the contents of the workflow step, and/or may add additional workflow steps to continue generating their workflow.

For example, as shown in FIG. 3, workflow step gallery generator 302 may enable steps 406A, 406B, and 406C to be selected for insertion into a workflow 404 being assembled in workflow designer GUI 116. Any number of workflow steps may be inserted.

In another example, a displayed page of workflow designer GUI 116 may display a template gallery generated by template gallery generator 304. The template gallery includes a plurality of selectable workflow templates, which each include one or more workflow steps pre-connected for operation. The workflow templates may be stored in workflow library 118, and accessed for display by workflow designer GUI 116. The developer may select one of the workflow templates for inclusion in their workflow, and may proceed with configuring the contents of the workflow template, and/or may add additional workflow steps to the workflow steps of the workflow template to generate a more complex workflow.

For instance, in the example of FIG. 4, steps 406A and 406B may have been included in a workflow template placed in workflow 404, step 406C may have been subsequently added (e.g., from a workflow step gallery).

In another example, saved workflow selector 306 may enable the developer to select an existing, saved workflow to be opened for further editing in a displayed page of workflow designer GUI 116. The saved workflows may be stored in workflow library 118 or elsewhere. For example, saved workflow selector 306 may display a list of saved workflows, may enable navigation to a saved workflow, and/or may provide another mechanism for selecting a saved workflow for editing. The developer may then proceed with further configuring the contents of the workflow, and/or may add additional workflow steps to the workflow steps of the workflow to generate a more complex workflow.

In step 204, selection of one or more steps for inclusion in the workflow is enabled. When a developer is editing a workflow, step selector 308 may enable the developer to select further workflow steps for inclusion in the workflow, and to order the steps. The workflow steps may be accessed by step selector 308 in workflow library 118. For instance, step selector 308 may display a pull-down menu of workflow steps, a scrollable and/or searchable list of available workflow steps, or may provide the workflow steps in another manner, and may enable the developer to select any number of workflow steps from the list for inclusion in the workflow.

In one example, step selector 308 may enable a developer to select a step that is associated with a local application, such as Microsoft® Outlook®, or a network-based application, such as Facebook®. Step selector 308 enables the steps to be chained together in a sequence, optionally with conditional steps, for inclusion in workflow logic 120.

In step 206, each of the selected steps in the workflow is enabled to be configured. In an embodiment, step configuration UI generator 310 enables configuration of each workflow step in a workflow. Step configuration UI generator 310 accesses each selected workflow step in workflow library 118 to determine the configuration of the workflow step, including all of its input parameters and any other selections or information that a user or developer needs to provide to the workflow step to configure it For example, step configuration UI generator 310 may generate a UI that enables the developer to type, navigate to, use a pull-down menu, or otherwise enter input data into a text input box or other data input element (e.g., input parameter) of a workflow step. The developer may configure an output of a prior step to be input data for a workflow step. Step configuration UI generator 310 may enable data or other objects to be copied and pasted, dragged and dropped, or otherwise entered copied from elsewhere into data input boxes of a workflow step.

In step 208, workflow logic to implement the workflow is generated. In an embodiment, workflow logic generator 112 is configured to package and generate workflow logic 120 based on constructed workflow information 138 when the developer indicates the workflow is finished, such as when the developer interacts with workflow designer GUI 116 to save the workflow. As shown in FIG. 3, workflow logic generator 112 receives constructed workflow information 138. Constructed workflow information 138 indicates which workflow steps have been inserted into the workflow, their input parameter values, and their sequencing. Workflow logic generator 112 also receives selected workflow logic 320, which is the workflow logic for each workflow step of the workflow as indicated in constructed workflow information 138. In one example, workflow logic generator 112 retrieves workflow logic from workflow library 118 for each workflow step indicated in constructed workflow information 138, to receive selected workflow logic 320. Workflow logic generator 112 generates workflow logic 120 for the workflow based on constructed workflow information 138 and selected workflow logic 320. For example, workflow logic generator 112 may generate workflow logic 120 in the form of an executable file, a zip file, or other form, which may be executed in a standalone fashion, may be executed in a browser, or may be executed in another manner, depending on the particular type of workflow being generated.

With reference to FIG. 3, workflow logic generator 112 may generate workflow logic 120 to include at least two components (e.g., files): workflow definition information 316 and interface definition information 318. Workflow definition information 316 includes information that defines the sequence and operation of the workflow of workflow logic (e.g., lists the workflow step operations and their ordering/sequencing) and includes the parameter values for the workflow. For example, workflow definition information 316 may be generated to contain information in the format of a JSON (JavaScript object notation) file or in another form. Interface definition information 318 includes information that defines the interfaces/parameters (e.g., inputs and outputs) of the workflow steps of the workflow. For example, interface definition information 318 may be generated to contain information in the format of a Swagger (a specification for REST (representational state transfer) web services) file or in another form. For instance, each workflow step may be represented in workflow library 118 as API (application programming interface) metadata in Swagger format, defining what are the necessary inputs and outputs (parameters) of the workflow step, such that a service may be accessed according to the API definition. In such an implementation, the operations in the workflow definition information 316 refer to the corresponding API metadata in the interface definition information 318 to give a complete structure of a generated workflow (e.g., each sequenced workflow step/operation defined with parameter values in the workflow definition information 316 has a corresponding API, which is defined in the interface definition information 318).

Accordingly, flowchart 200 and workflow designer 106 enable a developer to create workflows. FIGS. 5-8 shows views of an exemplary workflow in various phases of development using a development GUI, according to example embodiments. For example, each of FIGS. 5-8 show browser window 402 displaying a corresponding view of workflow designer GUI 116 being used to develop a workflow.

Figure 5:
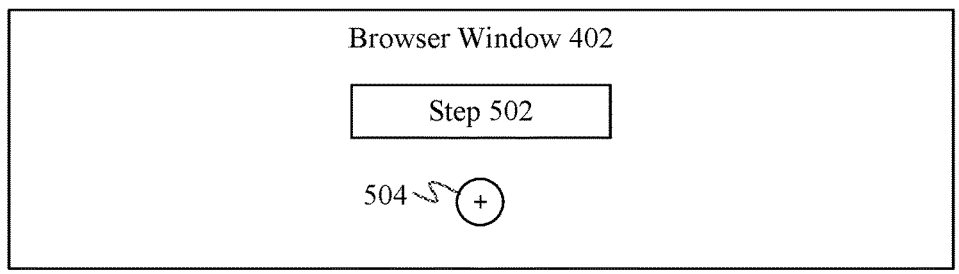
FIGS. 5-8 show views of an exemplary workflow in various phases of development using a workflow designer GUI, according to example embodiments.

For instance, FIG. 5 shows browser window 402 including a workflow step 502 and an add interface 504. Workflow step 502 was selected by a developer to be a first step in a workflow. Add interface 504 (e.g., a button or other GUI control) may be interacted with by the developer to add further workflow steps to the workflow.

As described above, a developer is enabled to select workflow step 502 from a list or library of steps, a gallery of workflow steps, a template gallery, or elsewhere. A list, library, or gallery may include any number of workflow steps. The workflow steps may be associated with network-based applications mentioned elsewhere herein or otherwise known (e.g., Dropbox™), and/or with local applications mentioned elsewhere herein or otherwise known (e.g., Microsoft® Outlook®). Each workflow step is configured for plug-and-place into the workflow. Each workflow step is configured with the appropriate logic and/or interface(s) to perform its respective function(s), which may include communicating with a local or remote application. For instance, a workflow step may be configured to transmit a query to an application (e.g., a search query to a search engine, a database query to a database, a request for data from a social networking application, etc.), being pre-configured how to properly transmit and format such a request to the application. The workflow step may be configured to receive a response to the request, being pre-configured how to parse the response for desired response data. As such, a developer of a workflow does not need to know how to write program code in a programming language, to interface with complex application interfaces (e.g., application programming interfaces (APIs)), or to understand network communication protocols, as the workflow steps are already setup. When a workflow step is plugged into workflow logic by a developer, the developer configures the inputs to the workflow step (as described below), and the otherwise pre-configured workflow step handles any communications with other applications.

Figure 6:
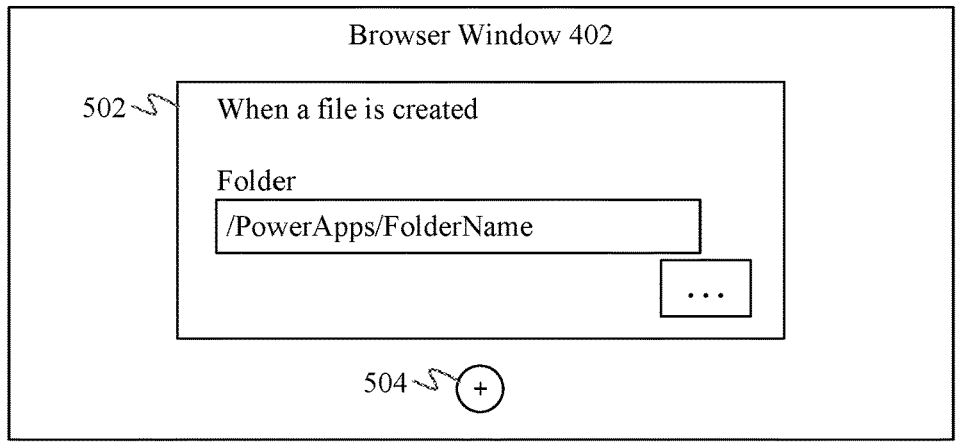

In FIG. 6, the developer has interacted with step 502 (e.g., by mouse click, etc.) to cause step configuration UI generator 310 to generate a UI for configuration of step 502. For instance, in the example of FIG. 6, workflow step 502 is configured to monitor for a file to be created in a particular folder identified by the developer in a text input box (e.g., by typing, clicking on a navigator indicated by " . . . ", etc.). When workflow step 502 determines a file is added to the indicated folder, a workflow step following workflow step 502 is triggered. Thus, workflow step 502 may be considered a trigger step in this example.

Figure 7:
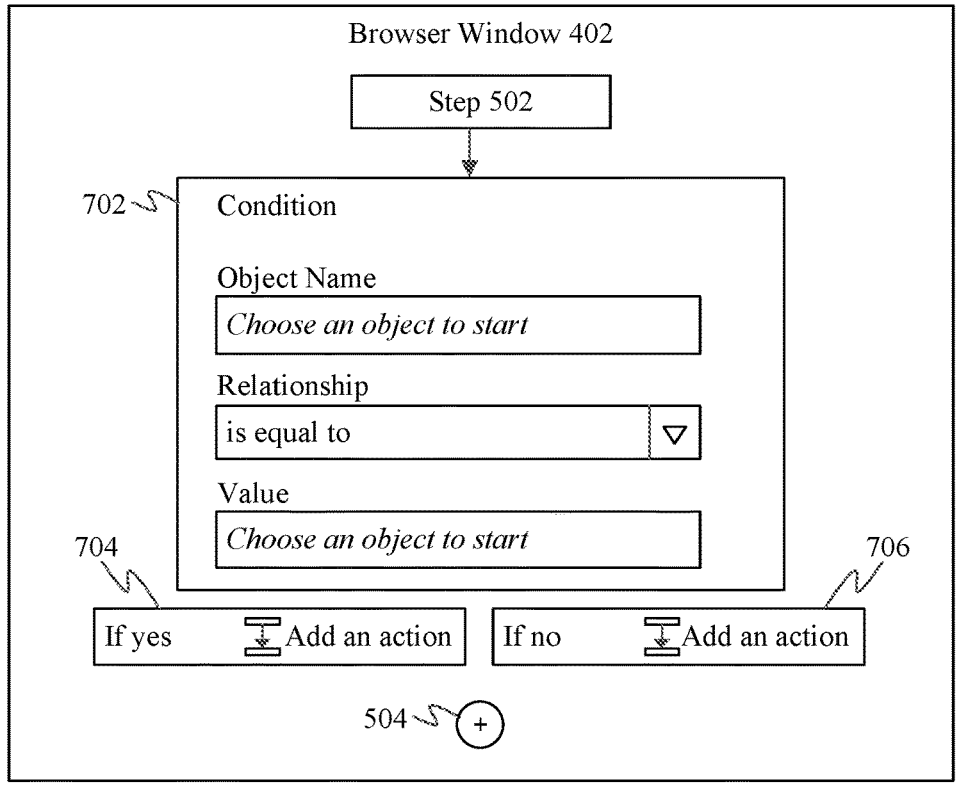

For instance, in FIG. 7, the developer interacted with add interface 504 to select a next workflow step 702. In an embodiment, interaction with add interface 504 invokes step selector 308 in FIG. 3, which enables the developer to select a workflow step. In the example of FIG. 7, workflow step 702 is a conditional step. In embodiments, logical elements may be selected for inclusion in a workflow, including arithmetic logic (e.g., summers, multipliers, etc.), conditional logic, etc., that operate based on variable values determined in earlier workflow steps. The condition of workflow step 702 enables the workflow to fork based on the determination of a condition (e.g., a variable value). The condition may include an object name, a relationship (e.g., a logical relationship, such as equal to, includes, not equal to, less than, greater than, etc.), and a value, which are all defined by the developer interacting with workflow step 702. Corresponding action steps may be performed depending on which way the workflow forks based on the condition.

In one illustrative example of FIG. 7, the object name may be selected (e.g., from a list of possibilities) to be a name of the created file of workflow step 502, the relationship may be "contains" (e.g., selected by a pull-down menu) and the value may be "dummyfile" (e.g., typed in by the developer). The condition evaluates to a "yes" condition if the file name contains "dummyfile," which invokes first action workflow step 704, and evaluates to "no" condition if the file name does not contain "dummyfile," which invokes second action workflow step 706. An action may be defined for one or both of the "yes" and "no" action workflow steps 704 and 706 by the developer, if desired.

Figure 8:
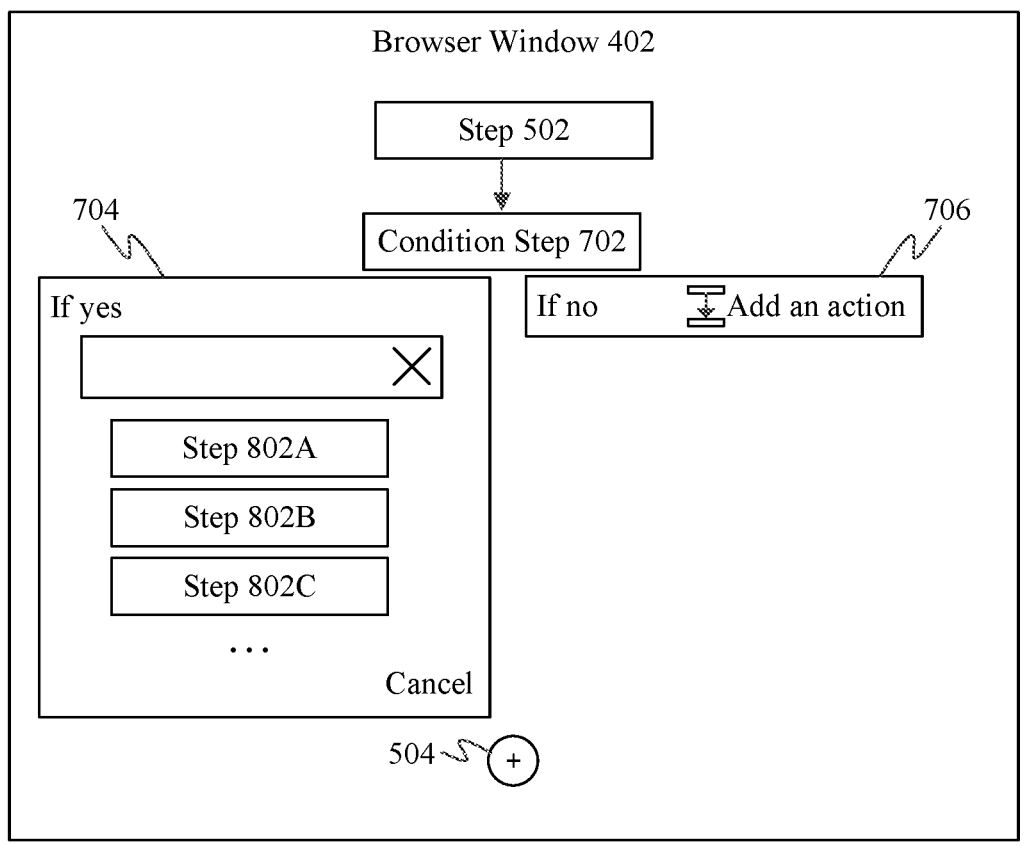

For example, in FIG. 8, the developer interacts with action workflow step 704 to define an action. In this example, the developer is defining action workflow step 704 by selecting a workflow step via step selector 308. As shown in FIG. 8, a list of workflow steps 802A, 802B, 802C is displayed, from which the developer can select a workflow step (e.g., by mouse click, etc.) to be performed for action workflow step 704. The workflow step can be a trigger step, an action step, or a condition step. After selecting the workflow step, the developer may configure the workflow step as described above. Furthermore, the developer may configure an action for workflow step 706, may add further workflow steps, etc., eventually being enabled to save the workflow.

It is noted that in some embodiments, a workflow step, such as first workflow step 502, may require credentials (e.g., a login and password) to access indicated data (e.g., to access a file at the location indicated in the text input box in FIG. 6). As such, the developer may be requested to provide credential information in association with first workflow step 502 so that when first workflow step 502 is performed during runtime, the data may be accessed. Alternatively, the credentials may be requested of a user during runtime.

According to embodiments, end users may execute workflows developed as described herein. During operation, an end user may interact with a GUI of the workflow, which may lead to workflow logic being executed. The workflow logic may execute locally (e.g., in a browser) and/or at a remote service (in "the cloud"). The workflow logic may access data of one or more applications, local or network-accessible, as was configured by the developer. Accordingly, the workflow performs its intended functions.

Figure 9:
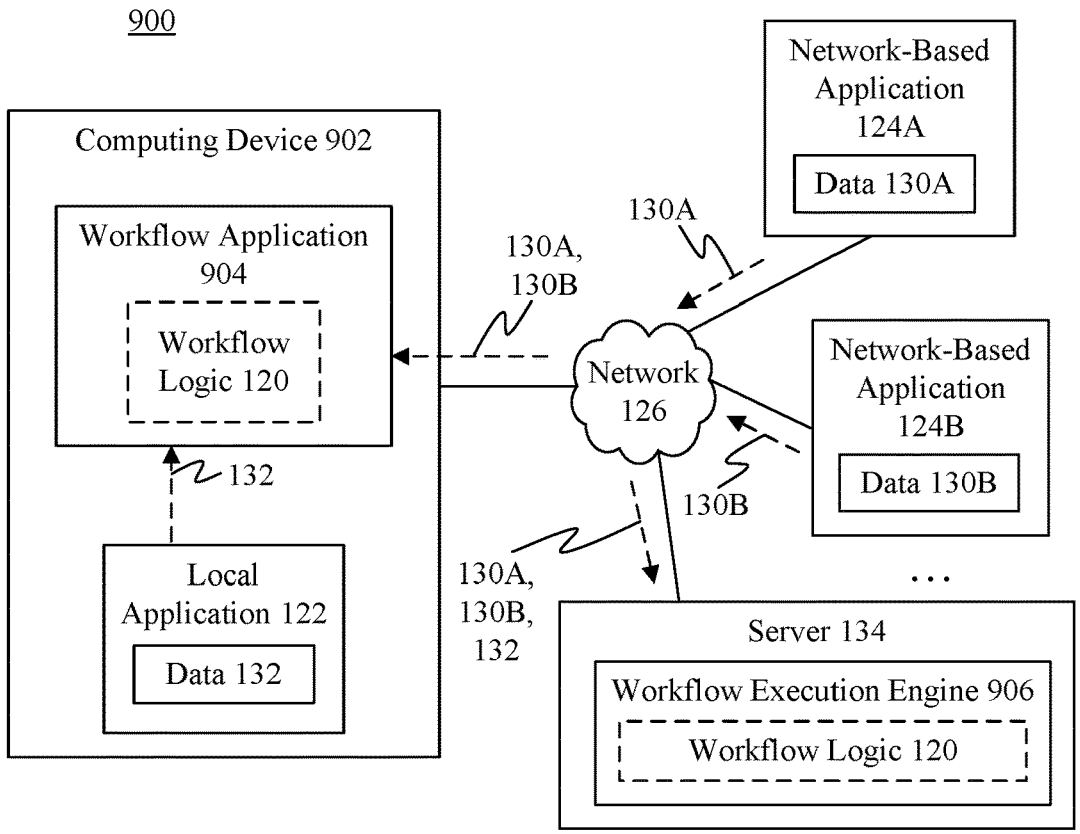
FIG. 9 is a block diagram of a system for executing a workflow in a runtime environment, according to an example embodiment.

FIG. 9 shows a block diagram of a system 900 for operating a workflow that includes one or more workflow steps, according to an example embodiment. As shown in FIG. 9, system 900 includes a computing device 902, first network-based application 124A, second network-based application 124B, and server 134. Computing device 902 includes a workflow application 904. Server 134 includes a workflow execution engine 906. System 900 is described as follows.

First and second network-based applications 124A and 124B are each optionally present, depending on the configuration of workflow logic 120. Further network-based applications may be present, depending on the configuration of workflow logic 120.

Computing device 902 may be any type of stationary or mobile computing device described herein or otherwise known. Computing device 902 is configured to communicate with first and second network-based applications 124A and 124B and server 134 over network 126.

In one embodiment, workflows are executed at server 134 by workflow execution engine 906, and workflow application 904 is a UI application that enables a user at computing device 902 to interact with the executing workflows, such as by selecting and invoking the workflows, receiving communications from the executing workflows (e.g., messages, alerts, output data, etc.), providing requested input data to executing workflows, etc. In such an embodiment, workflow application 904 may be a workflow UI application associated with workflow execution engine 906 (e.g., workflow application 904 may be an extension of workflow execution engine 906) that may operate separate from or within a browser at computing device 902, or may be configured in another way. As shown in FIG. 9, workflow execution engine 906 may load workflow logic 120 for a selected workflow (e.g., selected from a workflow library by a user), and may execute workflow logic 120 to execute the workflow.

In another embodiment, workflow application 904 may be configured to execute workflows at computing device 902. For instance, an end user of computing device 902 may interact with a user interface of workflow application 904 to select and invoke a particular workflow (e.g., selected from a workflow library). In such embodiments, workflow logic 120 may operate separate from or in a browser at computing device 902, or may be configured in another way. As shown in FIG. 9, workflow application 904 may load workflow logic 120 for a selected workflow (e.g., selected from a workflow library by a user), and may execute workflow logic 120 to execute the workflow.

In another embodiment, a first portion of workflow logic 120 may operate in workflow application 904 at computing device 902 and a second portion of workflow logic 120 may operate in workflow execution engine 906 at server 134 and/or elsewhere.

Figure 10:
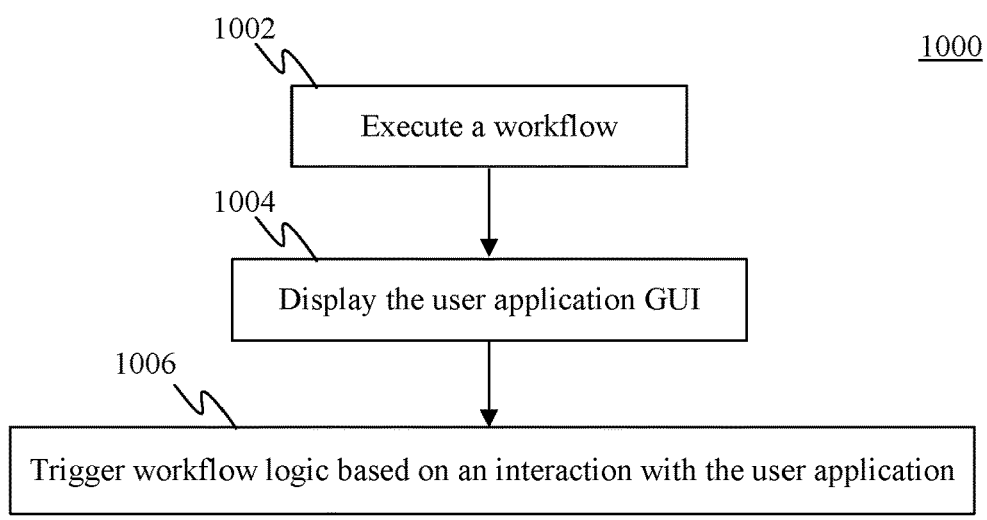
FIG. 10 depicts a flowchart of a process for executing a user application that includes one or more workflows in a runtime environment, according to an example embodiment.

FIG. 10 shows a flowchart 1000 providing a process for executing workflow logic 120 of a workflow, according to an example embodiment. Flowchart 1000 is described as follows with respect to system 900 of FIG. 9 for illustrative purposes.

Flowchart 1000 begins with step 1002. In step 1002, the workflow is executed. In an embodiment, an end user at computing device 902 may cause workflow logic 120 to be executed, such as by command line, by clicking/tapping or otherwise interacting with an icon representing the application, by selection in a browser, or in another manner. As described above, workflow logic 120 may execute in workflow application 904 at computing device 902 and/or in workflow execution engine 906 at server 134. When executed, the workflow steps of workflow logic 120 are performed in the configured sequence. Accordingly, one or more of the workflow steps may make calls to corresponding applications/services to perform their functions, such as local application 122 (to return data 132), network-based application 124A (to return data 130A), network-based application 124B (to return data 130B), and/or other applications, local or network-based.

In step 1004, the workflow GUI is displayed. Step 1004 is optional, as in some embodiments, a GUI is not displayed for a workflow. In an embodiment, the GUI may be displayed by workflow application 904 at computing device 902. When displayed, the user may interact with the GUI by reviewing displayed data (e.g., from a file, database record, spreadsheet, or other data structure read by the workflow), by entering data into the GUI (e.g., by typing, by voice, etc.), and/or by interacting with one or more controls displayed by the GUI.

In step 1006, workflow logic is triggered based on an interaction with the workflow. Step 1006 is optional in cases where one or more workflow steps of a workflow require input from a user. In such cases, the user interacts with a control in a GUI of workflow application 904 associated with a workflow step of workflow logic 120 to provide information that triggers logic of the workflow step to operate.

In this manner, workflow logic 120 performs its functions, such as processing orders, tracking information, generating messages, processing documents to generate tasks or information, collecting feedback, and/or any other functions.

B. Example Workflow Development System GUI and Workflow Steps for Automatic Code Generation for Data Transformations As discussed in the preceding section, workflow development system 100 enables a user to build a workflow by selectively adding predefined workflow steps to a workflow under development via workflow designer GUI 116. In accordance with an embodiment, one or more of the workflow steps may be configured to perform a data transform, where certain data may be transformed, reformatted, and/or re-shaped from one format to another format. The workflow step may utilize a PBE-based technique to determine the new format in which the data is to be formatted. In particular, the workflow step may enable the user to provide a set of one or more input examples, which are indicative of an output that should be achieved to comply with a user determined result. The workflow step (or workflow designer 106) analyzes the set of input examples to identify one or more logical patterns that are common to the set of input examples. The workflow step (or workflow designer 106) generates code or one or more expressions (e.g., a program, executable program code, function calls, regular expressions, etc.) that will output the user determined result based on the logical pattern(s) that are consistent with the user input examples.

In further accordance with such an embodiment, a set of predefined steps relating to data transformation are made available to the user for selective inclusion in the workflow. For example, step selector 308 of UI generator 110 may cause such steps to be displayed to the user via workflow designer GUI 116 for selection thereby. Also, template gallery generator 304 may display one or more user-selectable workflow templates, wherein each of the templates includes one or more predefined workflow steps that enable a user to transform data. Still other methods may be used to enable a user to select one or more workflow steps that enable a user transform data for inclusion within a workflow under development.

Such steps can also be combined with other workflow steps that are designed to interact with other applications (e.g., email applications, document management applications, database applications, social networking applications, financial services applications, news applications, search applications, productivity applications, cloud storage applications, file hosting applications, etc.).

As was previously described, workflow designer 106 generates workflow designer GUI 116 that enables a developer to configure a workflow step within a workflow under development, wherein such configuration includes specifying a value of an input parameter for the workflow step. In an embodiment, workflow designer GUI 116 enables a developer to easily specify a value of an input parameter of a second workflow step to include a value of an output parameter of a first workflow step in the same workflow.

In particular, in accordance with an embodiment, workflow designer GUI 116 represents output parameters of a first workflow step of a workflow under development as user-interactive objects. These objects can be easily interacted with (e.g., clicked on or dragged and dropped) by a developer to cause the objects to be inserted into a data entry element (e.g. a text box) that is used to specify a value for an input parameter of a second workflow step of the workflow under development. When executable logic representing the first and second workflow steps is generated, the aforementioned insertion of the objects into the data entry element has the effect of causing the value of the input parameter of the second workflow step to be defined to include the values of the output parameters that correspond to the inserted objects.

To help illustrate some of the foregoing concepts, FIGS. 11-15 depict example GUI screens of a workflow development system that can be used to create a workflow 1100 that generates an entry in a data structure (e.g., a list or table) when an entry is added to another data structure in accordance with an embodiment. The GUI screens may be generated, for example, by UI generator 110 of workflow designer 106 as previously described in reference to workflow development system 100 of FIG. 1.

Figure 11:
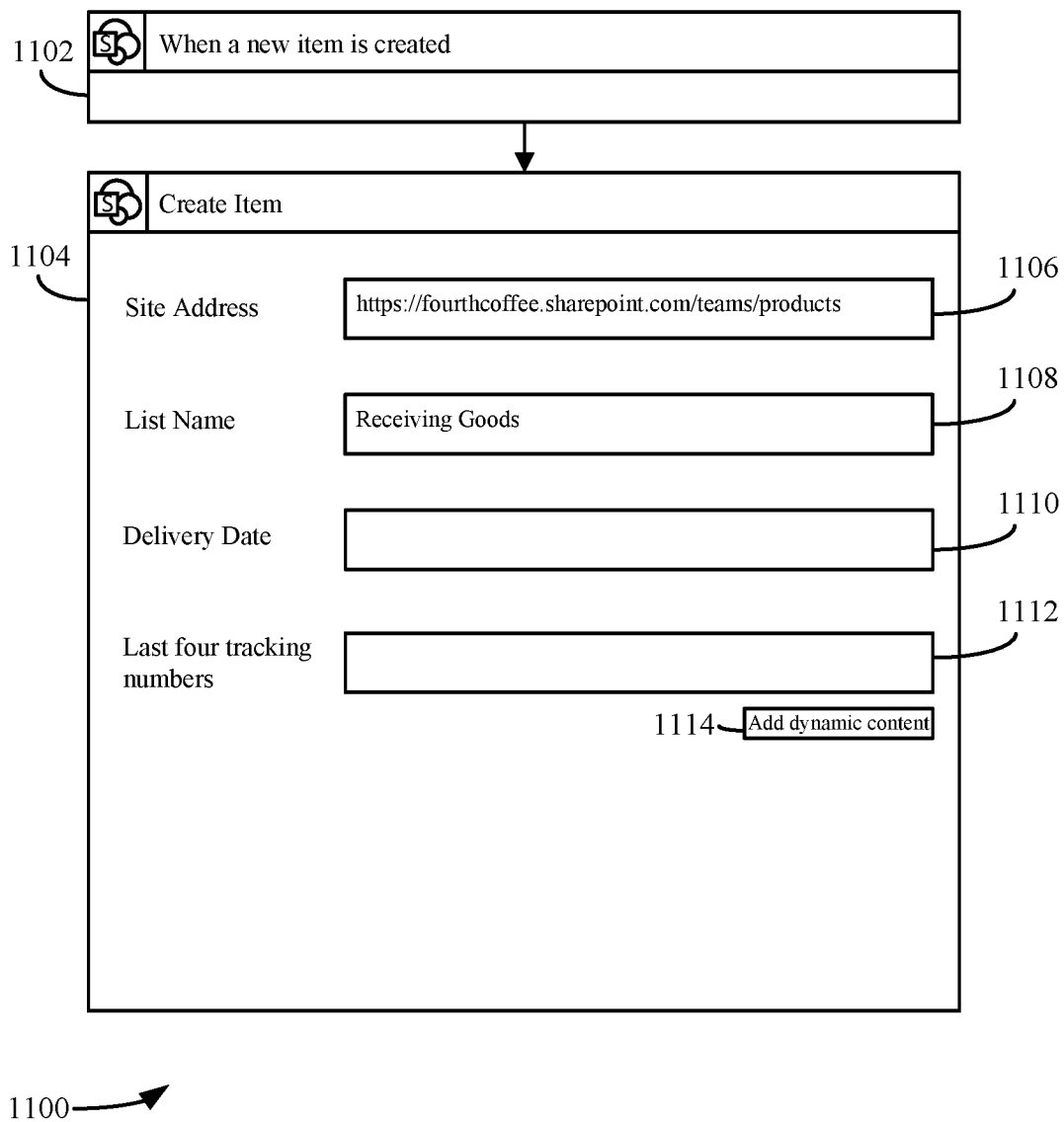
FIG. 11-15 depict example graphical user interface (GUI) screens of a workflow development system that can be used to automatically generate code to transform data in accordance with a programming-by-example (PBE) technique in accordance with an embodiment.

In particular, as shown in FIG. 11, workflow 1100 includes a first workflow step 1102, entitled "When a new item is created" and a second workflow step 1104, entitled "Create Item." Each of first workflow step 1102 and second workflow step 1104 may be configured to receive one or more user-customizable parameters that may be manually customized by the user. First workflow step 1102 is a trigger step, since it is activated at runtime by the occurrence of a triggering event. In this case, first workflow step 1102 is activated whenever a new item is created and/or added to a specified data structure (e.g., a list or table) maintained by a collaborative document management and storage system application, such as, but not limited to Microsoft Sharepoint™. The list or table is specified by workflow step 1102; however, the specified data structure is not shown for the sake of brevity.

Second workflow step 1104 is an action step because it causes an action to be performed at runtime in response to the execution of the trigger step (i.e., step 1102). In this case, the action in second workflow step 1104 is adding an entry to another data structure (e.g., a list or table) maintained by the collaborative document management and storage system application. As shown in FIG. 11, second workflow step 1104 includes a first data entry box 1106, a second data entry box 1108, a third data entry box 1110, and a fourth entry data entry box 1112. As further shown in FIG. 11, fourth data entry box 1112 is associated with a user-interactable interface element 1114. First data entry box 1112 is configured to receive, via user input, a uniform resource identifier (URI) that specifies an address of a web site (e.g., a website at which the data structure in which the new entry is to be added). Second data entry box 1108 is configured to receive, via user input, the name of the data structure in which the new entry is to be added. Third data entry box 1110 is configured to receive, via user input, a delivery date at which an item was delivered. Fourth data entry box 1112 is configured to enable a user, via user input, to specify a user-interactive object, which is provided as an input parameter in fourth data entry box 1112. The user-interactive object is an output parameter provided by a previous workflow step, such as workflow 1102. For instance, the user-interactive object may represent a tracking identification (ID) that was added to a data structure referenced by workflow step 1102.

User-interactable interface element 1114, when activated (e.g., via mouse click provided via a mouse, via touch input provided via a touch screen, etc.) by a user, enables a user to cause workflow designer 106 to determine code that transforms the data (e.g., represented by the user-interactive object) input into fourth data entry box 1112 into a desired format via a PBE-based technique.

Figure 12:
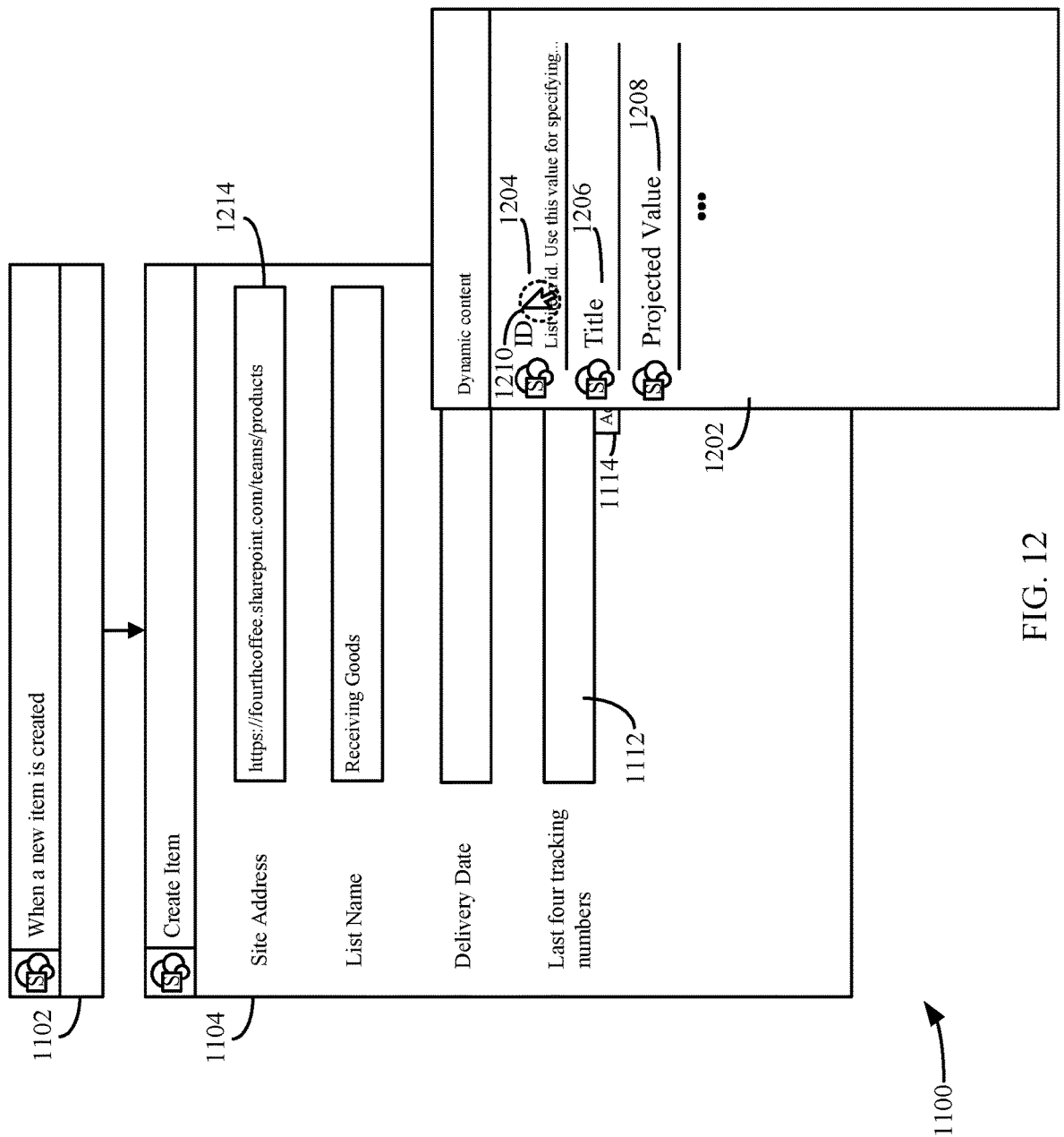

For instance, FIG. 12 depicts an example GUI screen of a workflow development system that is displayed responsive to a user activating user-interactable interface element 1114 in accordance with an example embodiment. As shown in FIG. 12, a graphical user interface (GUI) element 1202 (e.g., a panel or window) is displayed responsive to activating user-interactable interface element 1114. GUI element 1202 may be displayed proximate to user-interactable interface element 1114 and/or fourth data entry box 1112. GUI element 1202 displays one or more user-selectable output parameters 1204, 1206, and 1208 representative of output values provided by a previous workflow step, such as workflow 1102. In the example shown in FIG. 12, output parameter 1204 corresponds to a tracking ID of an entry included in a data structure referenced by workflow step 1102, output parameter 1206 corresponds to a title of an entry included in a data structure referenced by workflow step 1102, and output parameter 1208 corresponds to a projected value of an entry included in a data structure referenced by workflow step 1102. It is noted that the number and/or type of output parameters described herein are meant for purely exemplary purposes and that GUI element 1202 may list any number and/or types of output parameters that are provided via previous workflow steps.

Figure 13:
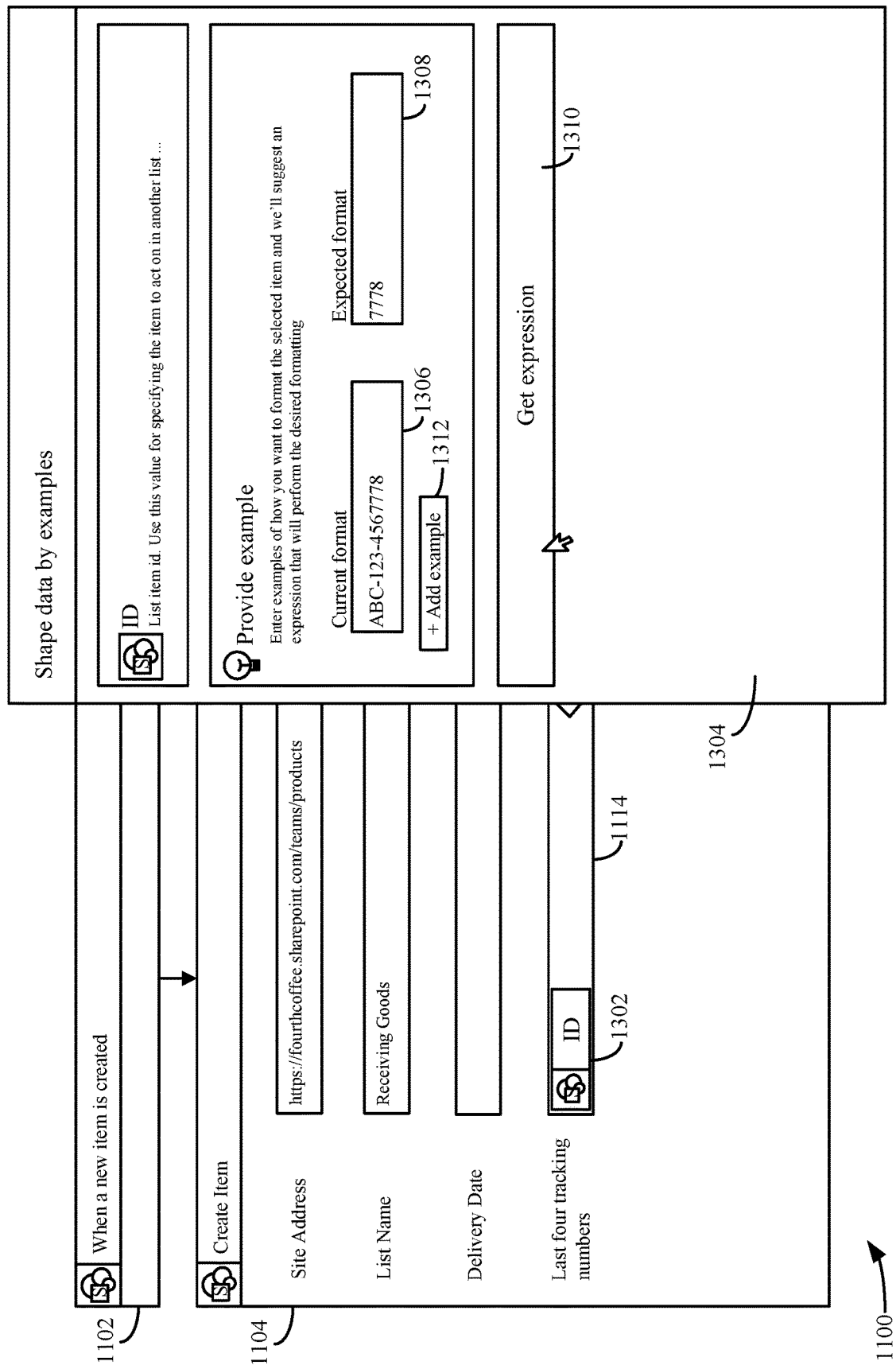

In the example described herein, the user desires to change the format of the tracking ID, and therefore, selects output parameter 1204 (e.g., by placing a cursor 1210 over output parameter 1204 and clicking on output parameter 1204). FIG. 13 depicts an example GUI screen of a workflow development system that is displayed responsive to a user selecting output parameter 1204 in accordance with an example embodiment. As shown in FIG. 13, responsive to selecting output parameter 1204, a user-interactable object 1302 corresponding to output parameter 1204 is displayed in user-interactable interface element 1114. In addition, a GUI element 1304 (e.g., a panel or window) is displayed that enables the user to enter one or more input examples by which workflow designer 106 learns and generates code that will output a re-formatted version of the tracking ID in accordance with the input example(s). Additional details regarding automatic code generation techniques are described below in Subsection D.

For example, as shown in FIG. 13, GUI element 1304 comprises a first data entry box 1306 and a second data entry box 1308. First data entry box 1306 enables a user to enter an example tracking identifier in its original format (as maintained by the data structure referenced by workflow step 1102 and as outputted via workflow step 1102). Second data entry box 1308 enables a user to input an example of how the tracking ID should be re-formatted (i.e., the expected format after transformation). In the example shown in FIG. 13, the user desires that the tracking ID to be truncated (or shortened) to its last 4 characters (e.g., last 4 digits). Accordingly, the user enters, in second data entry box 1308, the last four digits of the tracking ID specified via first data entry box 1306.

A user may be enabled to enter in more than one example via interaction with user interface element 1312 (e.g., a button). For instance, upon activation of user interface element 1312, additional first data entry box instances and second data entry box instances may be displayed, by which the user is enabled to enter additional examples of tracking identifiers (in their original format) and additional examples of tracking identifiers (in their expected format post-transformation), respectively.

As also shown in FIG. 13, GUI element 1304 also comprises a user-interactable interface element 1310 (e.g., a button). User-interactable interface element 1310, when activated, causes workflow designer 106 to generate code that re-formats the tracking identifier from the current format to the expected format (as specified by the user via first and second data entry boxes 1306 and 1308, respectively).

Figure 14:
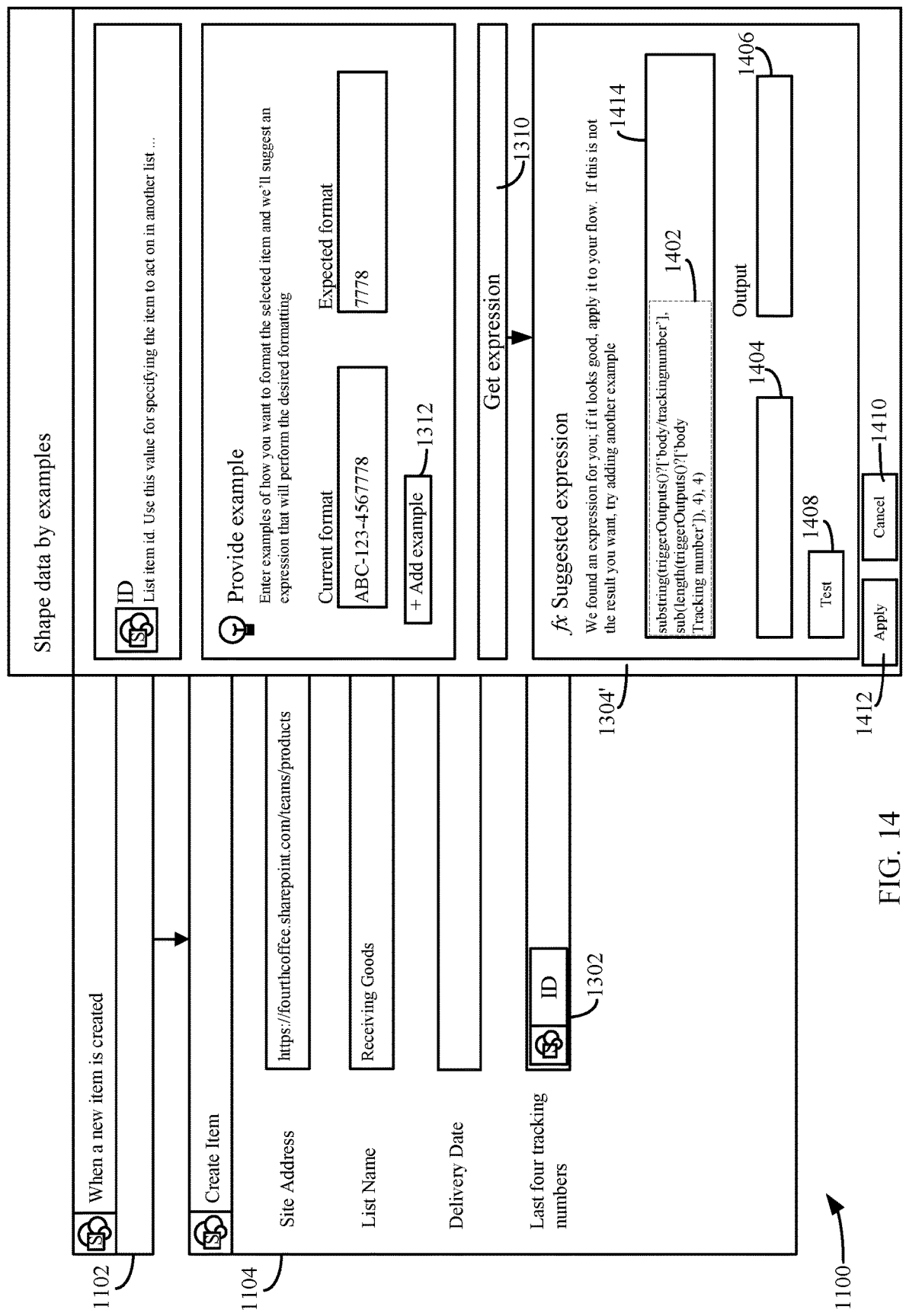

Responsive to activating user-interactable interface element 1310, GUI element 1304 is updated to specify code determined by workflow designer 106. For example, as shown in FIG. 14, GUI element 1304 is modified and/or updated (shown as element 1304') to display code 1402 (via a display element 1414) determined by workflow designer 106 based on the examples provided by the user. Updated panel 1304' may also comprise a data entry box 1404 and a user-interactable interface element 1408 (e.g., a button). The user may utilize data entry box 1404 and user-interactable interface element 1408 to test the generated code 1402. For instance, the user may enter data (e.g., another example tracking ID) into data entry box 1404. To test whether the generated code 1402 will output the desired transformed data, the user may activate user-interactable interface element 1408. Workflow generator 106 may apply generated code 1402 to the data inputted via data entry box 1404. The resulting, transformed data is presented via a GUI element 1406 (e.g., a display box). If the user is satisfied with the output, the user may accept generated code 1402 (e.g., via user-interactable interface element 1412). By embedding the ability to test the generated code 1402 within updated GUI element 1304', the user does not have to execute the entire workflow to determine whether the data is transformed into a desired format. Instead, the user simply tests out the generated code 1402 within the workflow step (e.g., workflow step 1104) that the user is presently configuring. This advantageously conserves compute resources (e.g., processing cycles, memory, storage, etc.), as the entire workflow is not required to be executed to determine whether a data transformation is working correctly.

If the user determines the generated code 1402, when executed, does not generate the desired transformed data, the user may provide additional examples via user-interactable interface element 1312, as described above, and generate other code. For instance, the user may activate a user-interactable interface element 1410 (e.g., a "Cancel" button) that causes panel 1304' to return to the form presented via FIG. 13. Thereafter, the user may provide additional examples via user-interactable interface element 1312 and generate other code by activating user-interactable interface element 1310, as described above with reference to FIG. 13.

Figure 15:
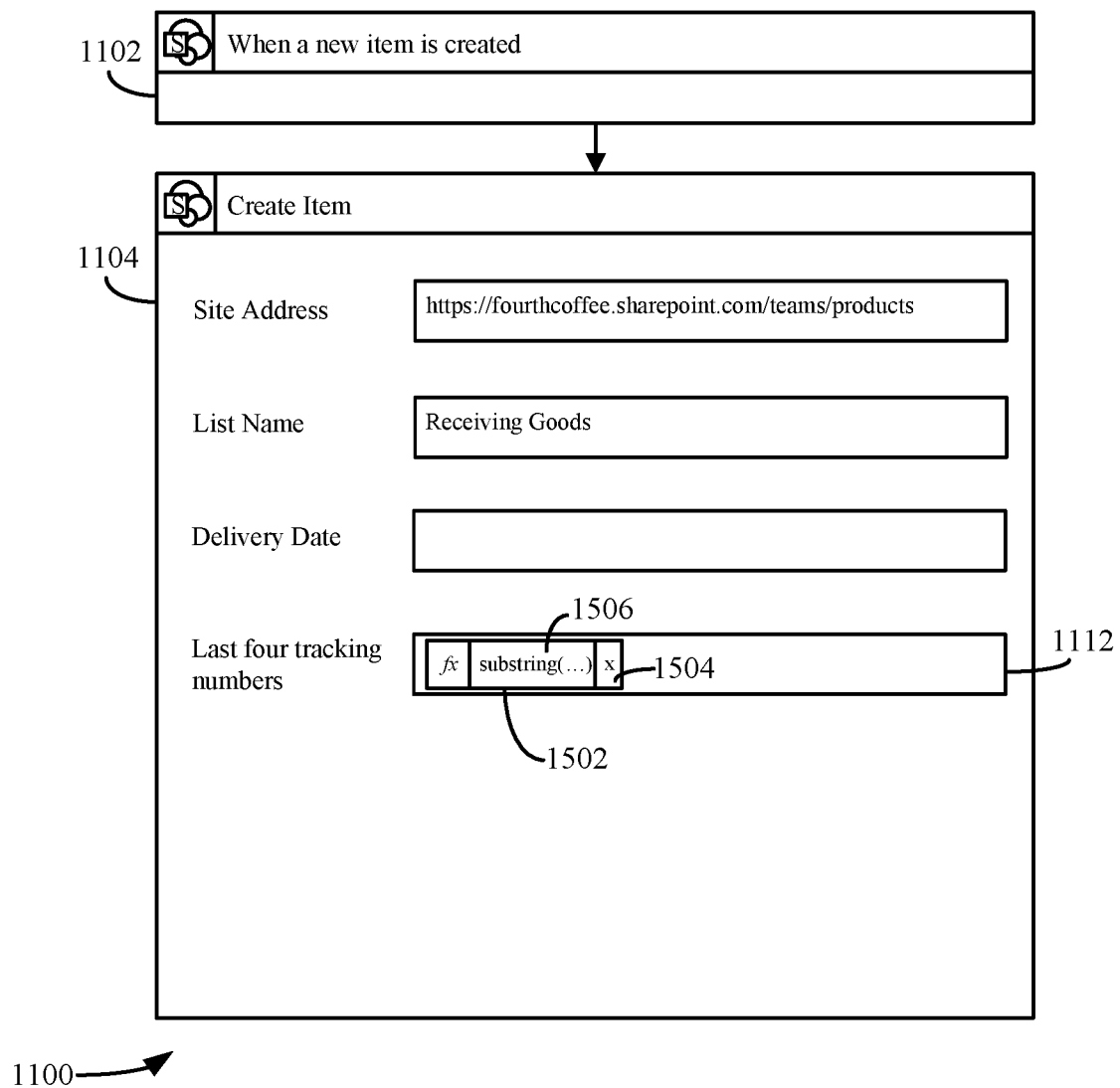

If the user determines that generated code 1402 has generated the desired transformed data, the user may accept the code 1402 by activating user-interactable interface element 1412 (e.g., an "Apply" button). For example, FIG. 15, depicts an example GUI screen of a workflow development system that is displayed responsive to a user accepting a generated code 1402 in accordance with an example embodiment. As shown in FIG. 15, responsive to a user activating user-interactable interface element 1412, a user-interactable object 1502 is inserted in data entry box 1112. User-interactable object 1502 represents code 1402, as applied to the tracking ID output parameter that is received via workflow step 1102. User-interactable object 1502 may replace user-interactable object 1302 (as displayed in FIGS. 13 and 14).

During execution of workflow step 1104, workflow step 1104 applies code 1402 as represented by user-interactable object 1502, to a tracking ID output parameter received via workflow step 1102. Execution of workflow step 1104 transforms the tracking ID received via workflow step 1102 such that it is truncated so that only the last four characters remain. The resulting tracking ID number is then added to an entry of the data structure ("Receiving Goods") referenced by workflow step 1104.

In accordance with an embodiment, a user may be enabled to delete or remove user-interactable object 1502 by clicking on a user-interactable interface element 1504 associated with user-interactable object 1502. In accordance with another embodiment, a user may be enabled to re-activate panel 1304 via a user-interactable portion 1506 of user-interactable interface element 1502. This way, the user may be able to provide additional examples and cause other code to be generated.

Figure 16:
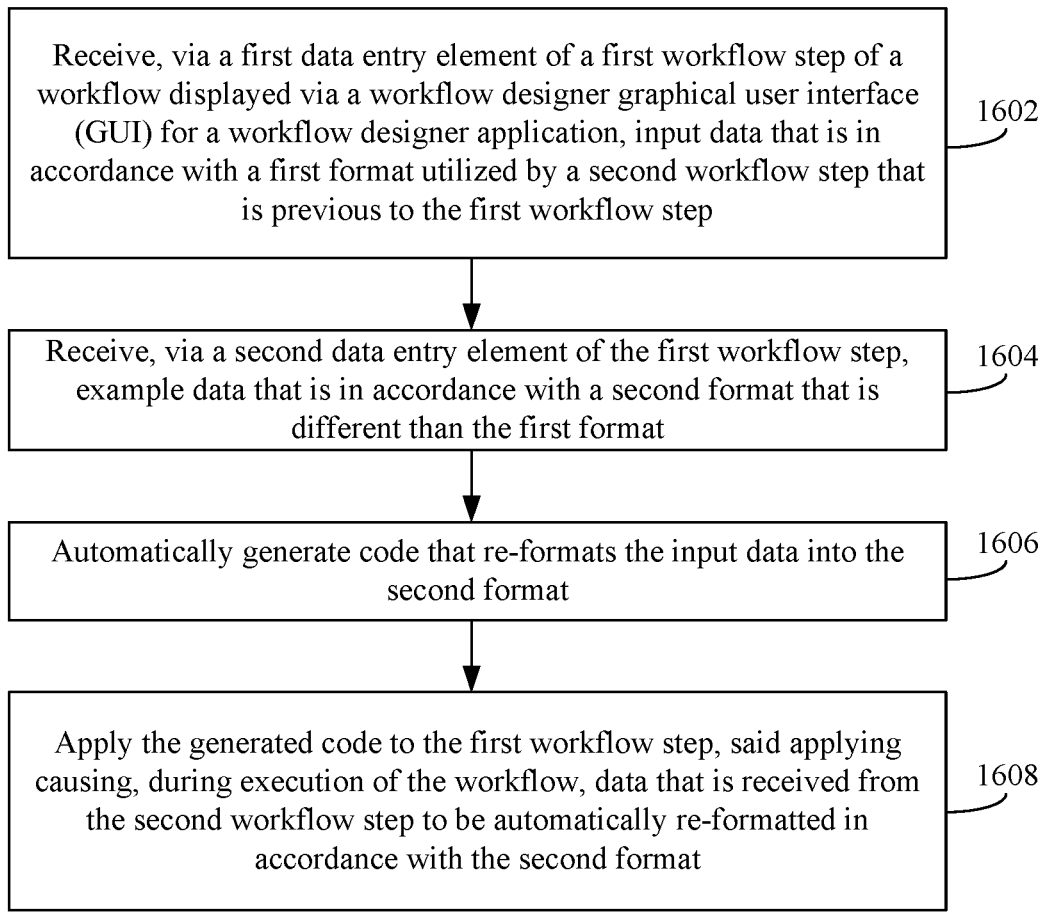
FIG. 16 depicts a flowchart of a method for developing workflow step(s) that include code generation for automatic data transformations in accordance with an embodiment.

C. Example Methods for Development of a Workflow Including Code Generation for Automatic Data Transformation A method for developing a workflow that includes workflow step(s) that include code generation for automatic data transformations will now be described. For example, FIG. 16 depicts a flowchart 1600 of a method for developing workflow step(s) that include code generation for automatic data transformations in accordance with an embodiment. In an embodiment, the method of flowchart 1600 may be performed, for example, by workflow development system 100 as described above. Accordingly, flowchart 1600 will be described with continued reference to FIG. 1. Other structural and operational embodiments will be apparent to persons skilled in the relevant art(s) based on the discussion regarding flowchart 1600 and system 100 of FIG. 1.

As shown in FIG. 16, the method of flowchart 1600 starts at step 1602. At step 1602, input data is received via a first data entry element of a first workflow step of a workflow displayed via a workflow designer graphical user interface (GUI) for a workflow designer application. The input data is in accordance with a first format utilized by a second workflow step that is previous to the first workflow step. For example, with reference to FIG. 1, workflow designer GUI 116 receives input data via a first data entry element of a first workflow step of a workflow displayed via workflow designer GUI 116 for workflow designer 106. As shown in FIG. 13, a user provides input data via first data entry box 1306 of workflow step 1204. The input data is in accordance with a first format utilized by workflow step 1202, which is previous to workflow step 1204.

At step 1604, example data that is in accordance with a second format that is different than the first format is received via a second data entry element of the first workflow step. For example, with reference to FIG. 1, workflow designer GUI 116 receives example data via a second data entry element of the first workflow step. As shown in FIG. 13, a user provides example data via second data entry box 1308 of workflow step 1204.

At step 1606, code that re-formats the input data into the second format is automatically generated. For example, with reference to FIG. 1, workflow designer 106 automatically generates code that is configured to re-format the input data into the second format. As shown in FIGS. 13-14, responsive to a user activating user-interactable interface element 1310, workflow designer 106 automatically generates code 1402 that is configured to re-format the input data provided via first data entry box 1306 into the second format.

At step 1608, the generated code is applied to the first workflow step, said applying causing, during execution of the workflow, data that is received from the second workflow step to be automatically re-formatted in accordance with the second format. For example, with reference to FIG. 1, workflow designer 106 applies the generated code to the first workflow step. As shown in FIGS. 14-15, responsive to a user activating user-interactive interface element 1412, workflow designer 106 applies code 1402 to workflow step 1104 by generating a user-interactive object 1502. During execution of workflow step 1104, workflow execution engine 906 (as shown in FIG. 9) automatically re-formats data that is received from workflow step 1102 in accordance with the second format via generated code 1402.

In accordance with one or more embodiments, the generated code is displayed via a GUI element associated with the first workflow step. For example, with reference to FIG. 1, workflow designer 106 is configured to display the generated code via a GUI element associated with the first workflow step via workflow designer GUI 116. As shown in FIG. 14, generated code 1402 is displayed via display element 1414 associated with workflow step 1104.

Figure 17:
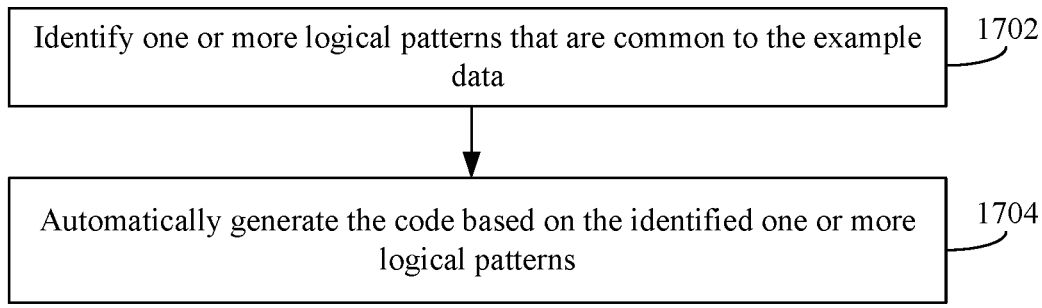
FIG. 17 depicts a flowchart of a method for automatically generating code based on an identification of one or more logical patterns in example data provided by the user in accordance with an example embodiment.

In accordance with one or more embodiments, the code is automatically generated based on identifying logical pattern (s) in the example data provided by the user. For example, FIG. 17 depicts a flowchart 1700 of a method for automatically generating code based on an identification of logical pattern(s) in example data provided by the user in accordance with an example embodiment. The method of flowchart 1700 may be performed, for example, by workflow development system 100 as described above. Accordingly, flowchart 1700 will be described with continued reference to FIG. 1. Other structural and operational embodiments will be apparent to persons skilled in the relevant art(s) based on the discussion regarding flowchart 1700 and system 100 of FIG. 1.

As shown in FIG. 17, the method of flowchart 1700 starts at step 1702. At step 1702, one or more logical patterns that are common to the example data are identified. For example, with reference to FIG. 1, workflow designer 106 is configured to identify logical pattern(s) that are common to the example data. As shown in FIG. 13, logical pattern(s) that are common to example data provided via instances of second data entry box 1308 may be identified.

At step 1704, the code is automatically generated based on the identified one or more logical patterns. For example, with reference to FIG. 1, workflow designer 106 is configured to automatically generate the code based on the identified logical pattern(s). Additional details regarding identifying logical pattern(s) and generating code based on the identified pattern(s) is described in Subsection D below.

Figure 18:
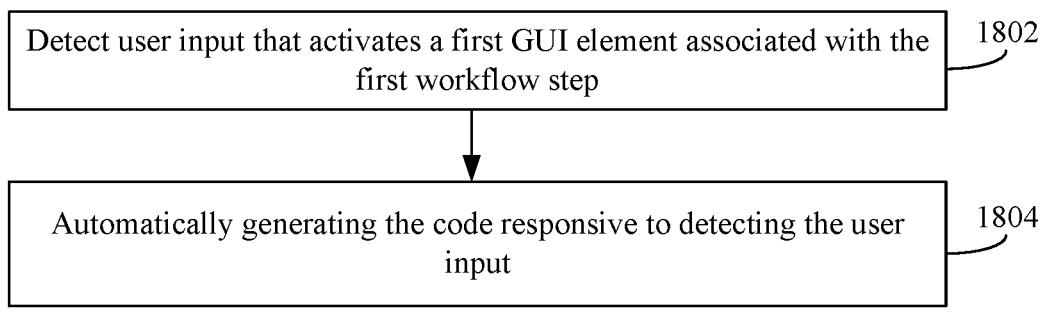
FIG. 18 depicts a flowchart of a method for automatically generating code responsive to activation of a graphical user interface element in accordance with an example embodiment.

In accordance with one or more embodiments, the code is automatically generated responsive to a user activating a GUI element. For example, FIG. 18 depicts a flowchart 1800 of a method for automatically generating code responsive to activation of a GUI element in accordance with an example embodiment. The method of flowchart 1800 may be performed, for example, by workflow development system 100 as described above. Accordingly, flowchart 1800 will be described with continued reference to FIG. 1. Other structural and operational embodiments will be apparent to persons skilled in the relevant art(s) based on the discussion regarding flowchart 1800 and system 100 of FIG. 1.

As shown in FIG. 18, the method of flowchart 1800 starts at step 1802. At step 1802, user input that activates a first GUI element associated with the first workflow step is detected. For example, with reference to FIG. 1, workflow designer GUI 116 is configured to detect user input that activates a first GUI element associated with the first workflow step is detected. As shown in FIG. 13, user input that activates GUI element 1310 may be detected.

At step 1804, responsive to detecting the user input, the code is automatically generated. For example, with reference to FIG. 1, workflow designer 106 is configured to automatically generate the code responsive to detecting the user input. As shown in FIGS. 13-14, code 1402 is automatically generated responsive to user input activating GUI element 1310.

Figure 19:
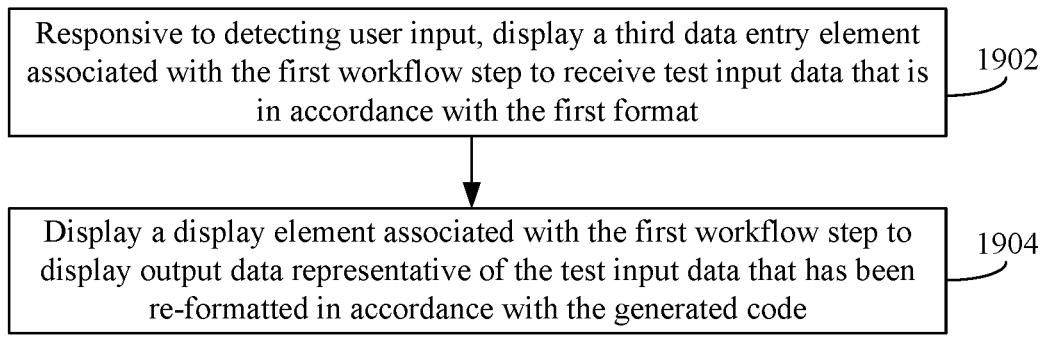
FIG. 19 depicts a flowchart of a method for enabling the testing of generated code in accordance with an example embodiment.

In accordance with one or more embodiments, a user is enabled to test the generated code via a workflow step before applying the code to a workflow step. For example, FIG. 19 depicts a flowchart 1900 of a method for enabling the testing of the generated code in accordance with an example embodiment. The method of flowchart 1900 may be performed, for example, by workflow development system 100 as described above. Accordingly, flowchart 1900 will be described with continued reference to FIG. 1. Other structural and operational embodiments will be apparent to persons skilled in the relevant art(s) based on the discussion regarding flowchart 1900 and system 100 of FIG. 1.

As shown in FIG. 19, the method of flowchart 1900 starts at step 1902. At step 1902, responsive to detecting user input, a third data entry element associated with the first workflow step to receive test input data that is in accordance with the first format is displayed. For example, with reference to FIG. 1, workflow designer GUI 116 is configured to, responsive to detecting user input, display a third data entry element associated with the first workflow step configured to receive test input data that is in accordance with the first format. As shown in FIG. 14, responsive to detecting user input that activates GUI element 1310, data entry element 1404 associated with workflow step 1104 is displayed. Data entry element 1404 is configured to receive test input data that is in accordance with the first format.

At step 1904, a display element is displayed that is associated with the first workflow step. The display element is to display output data representative of the test input data that has been re-formatted in accordance with the generated code. For example, with reference to FIG. 1, workflow designer GUI 116 is configured to, responsive to detecting user input, display a display element associated with the first workflow step. The display element is configured to display output data representative of the test input data that has been re-formatted in accordance with the generated code. As shown in FIG. 14, responsive to detecting user input that activates GUI element 1310, display element 1406 is displayed. Display element 1406 is configured to display output data representative of the test input data that has been re-formatted in accordance with generated code 1402.

In accordance with one or more embodiments, the display element is configured to display the output data responsive to detecting user input that activates a second GUI element associated with the first workflow step. For example, with reference to FIG. 1, workflow designer GUI 116 is configured to display the output data via the display element responsive to detecting user input that activates a second GUI element associated with the first workflow step. As shown in FIG. 14, display element 1406 may display the output data responsive to a user activating user-interactable interface element 1408.

D. Embodiments for Generating Code for Data Transformation

Figure 20:
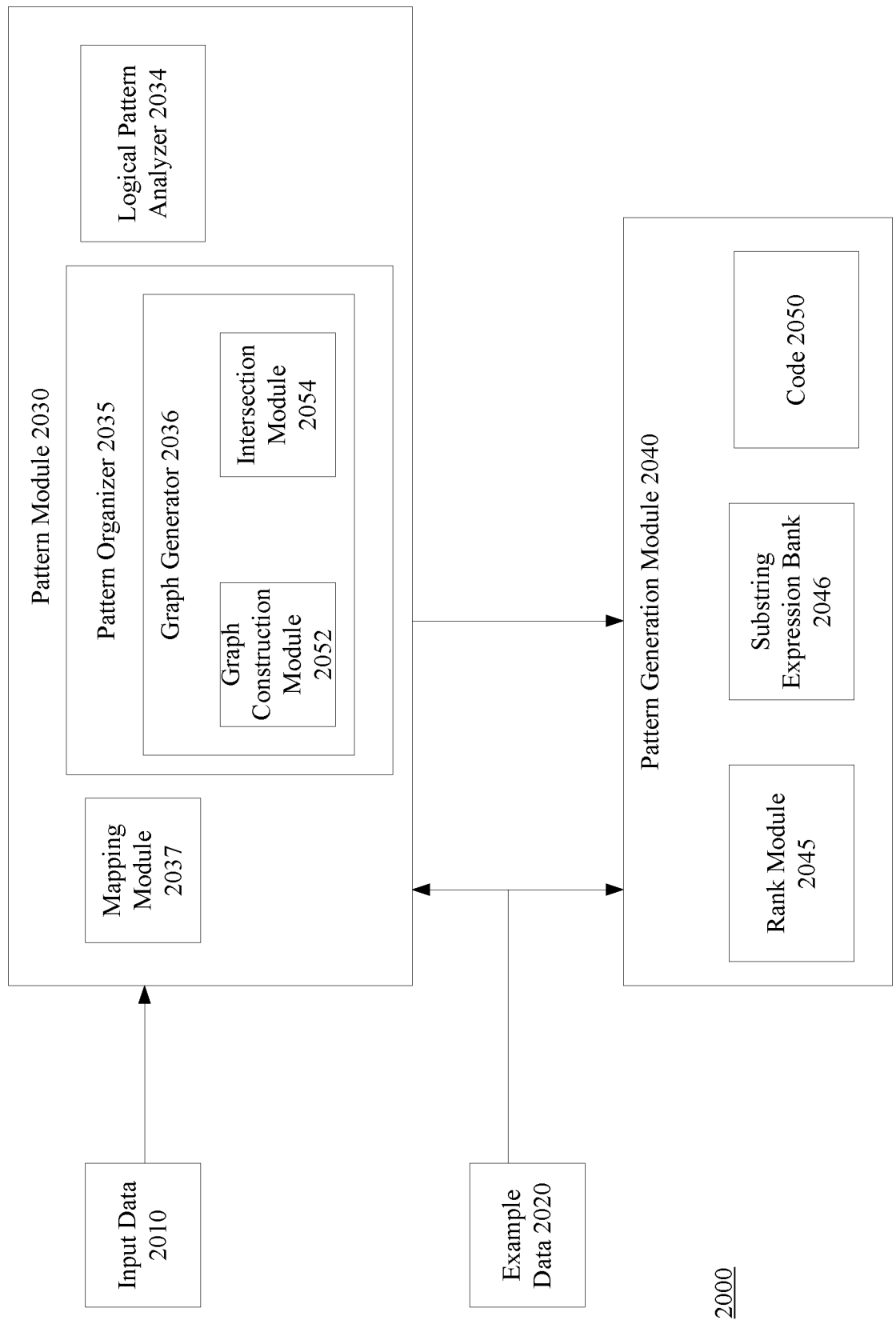
FIG. 20 depicts a block diagram of a PBE-based system in accordance with an example embodiment.

FIG. 20 depicts a block diagram of a PBE-based system 2000 in accordance with an example embodiment. System 2000 may be incorporated in workflow designer 106, as described above. System 2000 may include a pattern module 2030 and a pattern generation module 2040. Input data 2010 may represent data that is inputted by the user via instances of first data entry box 1306 (as shown in FIG. 13), and example data 2020 may represent data that is inputted by the user via instances of second data entry box 1308 (as shown in FIG. 13).

In an embodiment, example data 2020 may specify that a user would like the generated code to extract the set of individual authors from a bibliography section of a paper. In another embodiment, example data 2020 may specify that a user would like the generated code to extract a country name from a listing of cites and countries. In a further embodiment, example data 2020 may specify that a user would like the generated code to truncate an ID number. In still another embodiment, example data 2020 may specify that a user would like the generated code to format a date in a certain manner.

Pattern module 2030 receives input data 2010 and example data 2020. Logical pattern analyzer 2034 may determine all the logical patterns that are present in each input data 2010 provided thereto. For example, suppose a user provided three instances input 2010 via respective instances of first data entry box 1306. Logical pattern analyzer 2034 may analyze and determine all the logical patterns found in each instance of input data 2010. In this way, all the possible logical patterns for each instance of input data 2010 may be identified. The logical patterns may include common patterns found in each instance of input data 2010, such as common spacing between data strings, common locations of data strings, having a common white space in the data string, having a common data sting at the beginning or ending of the data string, or any other type of pattern that may be present in the input data. Accordingly, the embodiments disclosed herein are not limited by any particular type of logical patterns.

In some embodiments, the identified logical patterns represent a set of substring expression tokens that are commonly found in a domain-specific language (DSL), for example, utilized by workflow designer 106. These commonly used DSL substring expression tokens may be pre-programmed into the system so that the logical pattern analyzer 2034 may quickly identify the substring expression tokens without the need for a large amount of computing resources. For example, in some embodiments, logical pattern analyzer 2034 may have access to a table of the common substring expression tokens that can be utilized in quickly identifying the logical patterns.

In other embodiments, however, logical pattern analyzer 2034 is not limited to the set of common substring expression tokens. In such embodiments, logical pattern analyzer 2034 is able to determine substring expressions based on the logical patterns themselves. For example, if multiple instances of input data 2010 included string data that was not included in the set of preprogrammed common substring expression tokens but that had a common logical pattern across all of the inputs, logical pattern analyzer 2034 would be able to determine or learn the required substring expression based on the logical pattern across all of the inputs. Accordingly, this advantageously allows logical pattern analyzer 234 to analyze logical patterns regardless of whether they represent common substring expression tokens or not.

Once all possible logical patterns are determined or identified, a logical pattern organizer 2035 may organize the identified logical patterns in a way that can be used to generate the desired programs. For example logical pattern organizer 2035 may organize the logical patterns so that only those logical patterns that are commonly found in all the instances of input data 2010 are used when generating the code.

In one embodiment, logical pattern organizer 2035 may include a graph generator 2036. In operation, graph generator 2036 may generate a graph for all possible logical patterns for each instance of input data 2010 as a way of organizing the logical patterns. Graph generator 2036 may then intersect each of the individual graphs for each of the inputs to thereby generate a new intersected graph that includes the logical patterns that are common to each of the inputs.

In some embodiments, logical pattern module 2030 may include a mapping module 2037. In operation, mapping module 2037 may map the logical patterns that are organized by logical pattern organizer 2035 with data strings of instances of input data 2010 and with substring expressions that represent the logical patterns. This mapping may then be used to generate code that will result in the user intended result.

Pattern generation module 2040 may receive the organized logical patterns that have been organized by logical pattern organizer 2035 and that have been mapped by mapping module 2037. Pattern generation module 2040 may also receive instances of example data 2020.

Pattern generation module 2040 may include a rank module 2045 that ranks the various logical patterns based on the user input examples to find the logical pattern that is most likely to output the user intended or desired output. In the embodiment utilizing the graph generator 2036, ranking module 2045 may find the longest path in the intersected graph to determine which logical patterns are most likely to result in the desired output.

Pattern generation module 2040 also includes or has access to a substring expression bank 2046. The substring expression bank includes DSL substring expressions that can be used in the generated code to achieve the desired result.

Pattern generation module 2040 uses the logical pattern most likely to output the user intended result that is determined by the ranking module to generate the output program 2050. In some embodiments, the program generator uses the mapping provided by mapping module 2037 to select the appropriate substring expressions from the substring expression bank 2046 when generating the program. The generated output code 2050 may then be applied to input data 2010 to produce the user desired or intended result. In some embodiments, the desired or intended result may be shown on a user interface (e.g., workflow designer GUI 116) to the user.

For example, if the user would like the generated program to extract the set of individual authors from the Bibliography section of a paper, then the generated code would output the list of authors to the user. In this way, even if the user did not know how to generate the code, PBE computing system 2000 is able to generate the required code based on the common logical patterns found in the input data.

Graph generator 2036 may comprise a graph construction module 2052 and an intersection module 2054. Graph construction module 2052 is configured to construct a graph for all of the logical patterns for each instance of input data

2010. For example, the user may provide the following input data: "Mumbai, India," "Los Angeles, USA", "Newark USA", New York USA", Wellington, New Zealand, and "New Delhi," India. The user may also provide the following example data: "India," "USA," "USA," "USA," "New Zealand," and "India." Here, the user desires to extract each country form the list of city and country pairs. Given each user input example (e.g., "Mumbai, India"→"India"), there are a large number of possible regular expression-based logics to extract the substring "India". For example, to identify the left index of the substring, some possible logics are: i) start of 2nd alphabet token, ii) start of 2nd alphanumeric, iii) end of 1st whitespace, iv) end of 1st comma followed by whitespace, etc. There may be more than 103 different logics in a typical DSL that can identify this position. Similarly, for the right index of the substring, there may also be more than 103 different logics. Accordingly, there is a need to use the input logical patterns as explained to reduce the number of possible logics so that the desired program may be arrived at in an efficient manner.

Figure 21A:
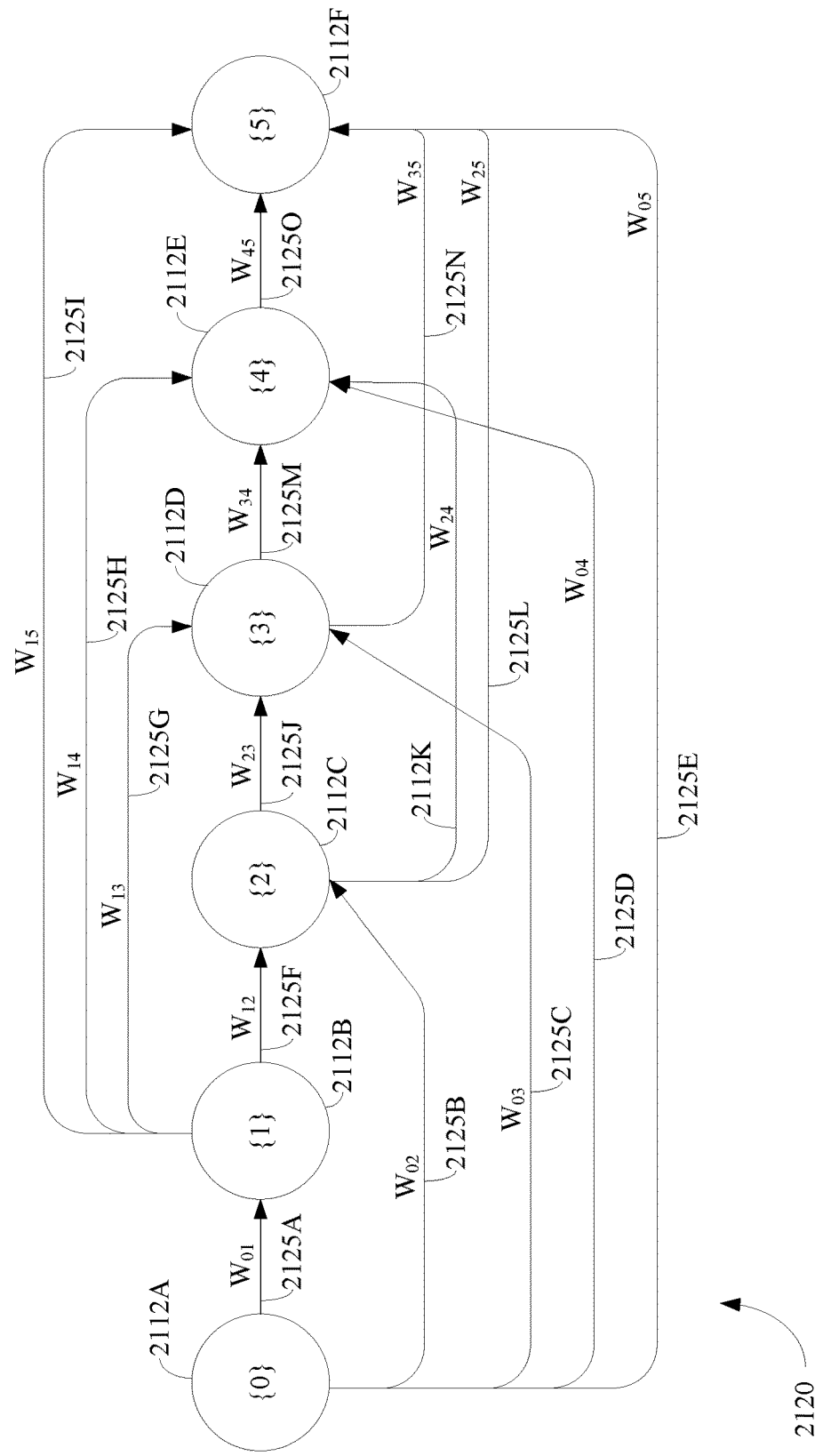
FIG. 21A depicts a graph generated by the PBE-based system utilized to generate code in accordance with an example embodiment.

Graph construction module 2052 may generate a graph 2120 for the input entry "India" as illustrated in FIG. 21A. Graph 2120 includes nodes 2121A, 2121B, 2121C, 2121D, 2121E, and 2121F that represent the indices of "India" as illustrated at 2122. Graph 2120 also includes edges 2125A-2125O that respectively connect the various nodes and that represent the substring expressions of the logical patterns for each of the indices. The edges of graph 2120 also include mapping functions $W_{01}$-$W_{45}$ as shown in the figure. In FIG. 21A, the edge mapping functions $W_{01}$-$W_{45}$ correspond to substring expressions consisting of left and right position expressions, where each position expression is denoted by a set of nodes from the intersection graph as will be explained in further detail to follow.

Although not illustrated, logical pattern module 2030 may generate a graph for each of the other input entries similar to "Mumbai, India". For example, a graph may be generated for "Los Angeles, United States of America", "Newark, United States", "New York, United States of America", "Wellington, New Zealand", and "New Delhi, India".

Figure 21B:
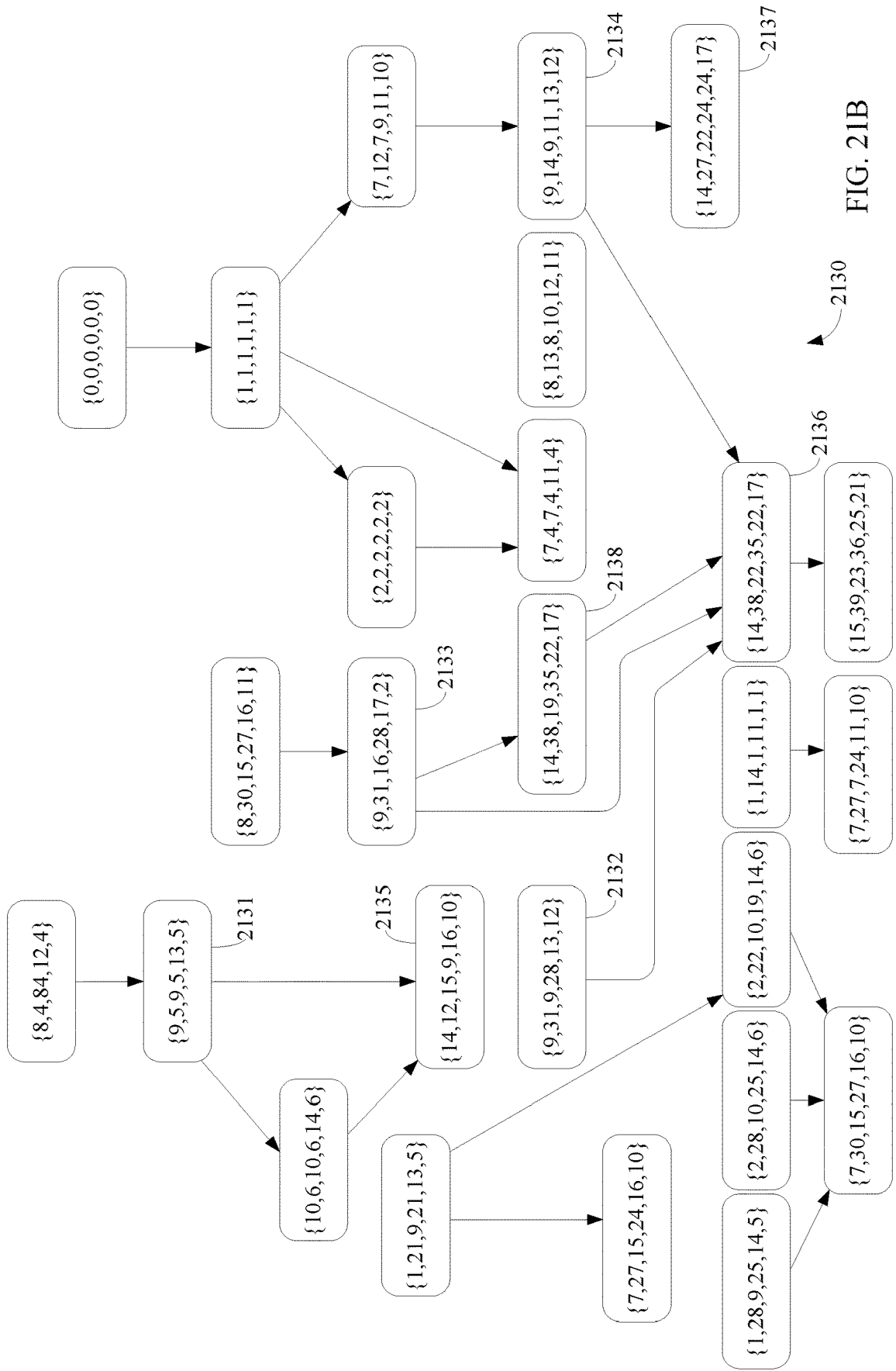
FIG. 21B depicts an intersection graph generated by the PBE-based system utilized to generate code in accordance with an example embodiment.

Intersection module 2020 may then generate an intersected graph 2130 of graph 2120 and the non-illustrated graphs for the other inputs, as shown in FIG. 21B. The intersection of the graphs may be based on the logical patterns that are common across all the input entries.

As shown in FIG. 21B, intersected graph 2130 includes nodes and edges. It will be appreciated that for brevity, not all of the edges are illustrated in FIG. 21B. In addition, for ease of explanation, only some of the nodes and edges will be explained and the mapping indicators are not included.

Graph 2130 includes nodes 2131-2138. Each of the nodes 2131-2138 represents index locations of the desired string to be extracted in the input data 2010. For example, the node 2134 represents the string indices {9, 14, 9, 11, 13, 12} from the input data entries described above. The 9 represents the $9^{th}$ index in the string "Mumbai, India", which is the location of the "I" in India. The 14 represents the 14th index in the string "Los Angeles, United States of America", which is the location of the "U" in United. In like manner, the remaining indices 9, 11, 13, 12 represent the location of the strings "U", "U", "N", and "I" in the other entry examples described above, respectively. It will be appreciated that each of the strings represented by node 2134 is the first letter of the name of the country to be extracted from the data. This is an example of a logical pattern in the example input data that is common across all input entries.

As another example of a node, node 2136 represents the string indices {14, 38, 22, 35, 22, 17} from the example input data entries described above. The 14 represents the 14th index in the string "Mumbai, India", which is the location of the "a" in India. The 38 represents the 38th index in the string "Los Angeles, United States of America", which is the location of the "a" in America. In like manner, the remaining indices 22, 35, 22, 17 represent the location of the strings "s", "a", "d", and "a" in the example string entries described above, respectively. It will be appreciated that each of the strings represented by node 2136 is the last letter of the name of the country to be extracted from the data. This is another example of a logical pattern in the example input data that is common across all input entries.

Rank module 2045 may then rank graph 2130 to determine a longest path from a start node to a finish node that will generate the user desired output. In the present example where the user input example is "Mumbai, India"→"India", rank module 2045 may determine the longest path that will extract India from Mumbai. In other words, the substring expressions represented by the edges of the longest path, when combined, would consist of code that is likely to extract "India" from "Mumbai, India" and to extract the other countries of the input data. If the user provided a second user input example, for example, "Los Angeles, United States of America"→"United States of America", then rank module 2045 would look for the longest path that would extract both India and United States of America.

As previously discussed in relation to FIG. 21A, in some embodiments, the substring expressions may include the position expression pi, which represents the index or location of the left most string and the position expression $p_r$, which represents the index or location of the right most string. In other words, the position expressions pi and $p_r$ denote the set of possible expressions for the left index and right index respectively. Each of the position expressions corresponds to a set of nodes in intersected graph 2130. For example, pi and $p_r$ for "India" are 9 and 14 respectively and correspond to those nodes of the intersected graph 2130, such as nodes 2131-2138, that show the 9 and the 14. In such embodiments, rank module 2045 determines a longest path length for the index pi and for the index $p_r$ when generating the code.

It is noted that the code generated techniques described herein are purely exemplary and that other code generation techniques may be utilized.

III. Example Mobile and Stationary Device Embodiments

Each of workflow designer 106, UI generator 110, workflow logic generator 112, workflow execution engine 906, pattern module 2030, and/or pattern generation module 2040 (and/or any of the components thereof) and/or any of the steps of flowcharts 200, 1000, 1600, 1700, 1800, and/or 1900 may be implemented in hardware, or hardware combined with software and/or firmware. For example, each of workflow designer 106, UI generator 110, workflow logic generator 112, workflow execution engine 906, pattern module 2030, and/or pattern generation module 2040 (and/or any of the components thereof) and/or any of the steps of flowcharts 200, 1000, 1600, 1700, 1800, and/or 1900 may be implemented as computer program code/instructions configured to be executed in one or more processors and stored in a computer readable storage medium. Alternatively, each of workflow designer 106, UI generator 110, workflow logic generator 112, workflow execution engine 906, pattern module 2030, and/or pattern generation module 2040 (and/or any of the components thereof) and/or any of the steps of flowcharts 200, 1000, 1600, 1700, 1800, and/or 1900 may be implemented as hardware logic/electrical circuitry such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 22:
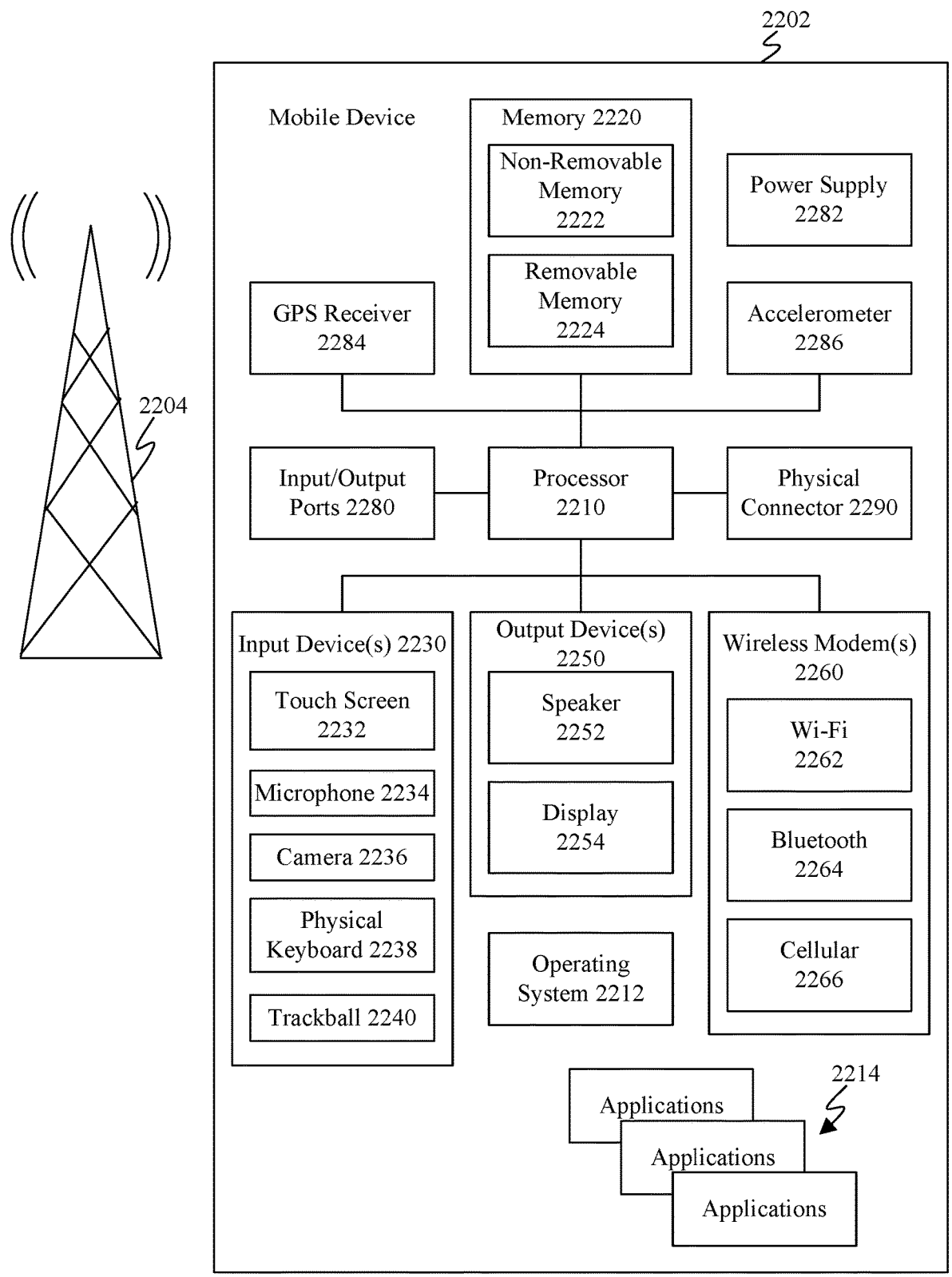
FIG. 22 is a block diagram of an exemplary user device in which embodiments may be implemented.

FIG. 22 shows a block diagram of an exemplary mobile device 2200 including a variety of optional hardware and software components, shown generally as components 2202. Any number and combination of the features/elements of components 2202 may be included in a mobile device embodiment, as well as additional and/or alternative features/elements, as would be known to persons skilled in the relevant art(s). It is noted that any of components 2202 can communicate with any other of components 2202, although not all connections are shown, for ease of illustration. Mobile device 2200 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 2204, such as a cellular or satellite network, or with a local area or wide area network.

The illustrated mobile device 2200 can include a controller or processor referred to as processor circuit 2210 for performing such tasks as signal coding, image processing, data processing, input/output processing, power control, and/or other functions. Processor circuit 2210 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2210 may execute program code stored in a computer readable medium, such as program code of one or more applications 2214, operating system 2212, any program code stored in memory 2220, etc. Operating system 2212 can control the allocation and usage of the components 2202 and support for one or more application programs 2214 (a.k.a. applications, "apps", etc.). Application programs 2214 can include common mobile computing applications (e.g., email applications, calendars, contact managers, web browsers, messaging applications) and any other computing applications (e.g., word processing applications, mapping applications, media player applications).

As illustrated, mobile device 2200 can include memory 2220. Memory 2220 can include non-removable memory 2222 and/or removable memory 2224. The non-removable memory 2222 can include RAM, ROM, flash memory, a hard disk, or other well-known memory storage technologies. The removable memory 2224 can include flash memory or a Subscriber Identity Module (SIM) card, which is well known in GSM communication systems, or other well-known memory storage technologies, such as "smart cards." The memory 2220 can be used for storing data and/or code for running the operating system 2212 and the applications 2214. Example data can include web pages, text, images, sound files, video data, or other data sets to be sent to and/or received from one or more network servers or other devices via one or more wired or wireless networks. Memory 2220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 2220. These programs include operating system 2212, one or more application programs 2214, and other program modules and program data. Examples of such application programs or program modules may include, for example, computer program logic (e.g., computer program code or instructions) for implementing the systems described above, including the workflow development and execution systems described in reference to FIGS. 1-21B.

Mobile device 2200 can support one or more input devices 2230, such as a touch screen 2232, microphone 2234, camera 2236, physical keyboard 2238 and/or trackball 2240 and one or more output devices 2250, such as a speaker 2252 and a display 2254.

Other possible output devices (not shown) can include piezoelectric or other haptic output devices. Some devices can serve more than one input/output function. For example, touch screen 2232 and display 2254 can be combined in a single input/output device. The input devices 2230 can include a Natural User Interface (NUI).

Wireless modem(s) 2260 can be coupled to antenna(s) (not shown) and can support two-way communications between processor circuit 2210 and external devices, as is well understood in the art. The modem(s) 2260 are shown generically and can include a cellular modem 2266 for communicating with the mobile communication network 2204 and/or other radio-based modems (e.g., Bluetooth 2264 and/or Wi-Fi 2262). Cellular modem 2266 may be configured to enable phone calls (and optionally transmit data) according to any suitable communication standard or technology, such as GSM, 3G, 4G, 5G, etc. At least one of the wireless modem(s) 2260 is typically configured for communication with one or more cellular networks, such as a GSM network for data and voice communications within a single cellular network, between cellular networks, or between the mobile device and a public switched telephone network (PSTN).

Mobile device 2200 can further include at least one input/output port 2280, a power supply 2282, a satellite navigation system receiver 2284, such as a Global Positioning System (GPS) receiver, an accelerometer 2286, and/or a physical connector 2290, which can be a USB port, IEEE 1394 (FireWire) port, and/or RS-232 port. The illustrated components 2202 are not required or all-inclusive, as any components can be not present and other components can be additionally present as would be recognized by one skilled in the art.

Figure 23:
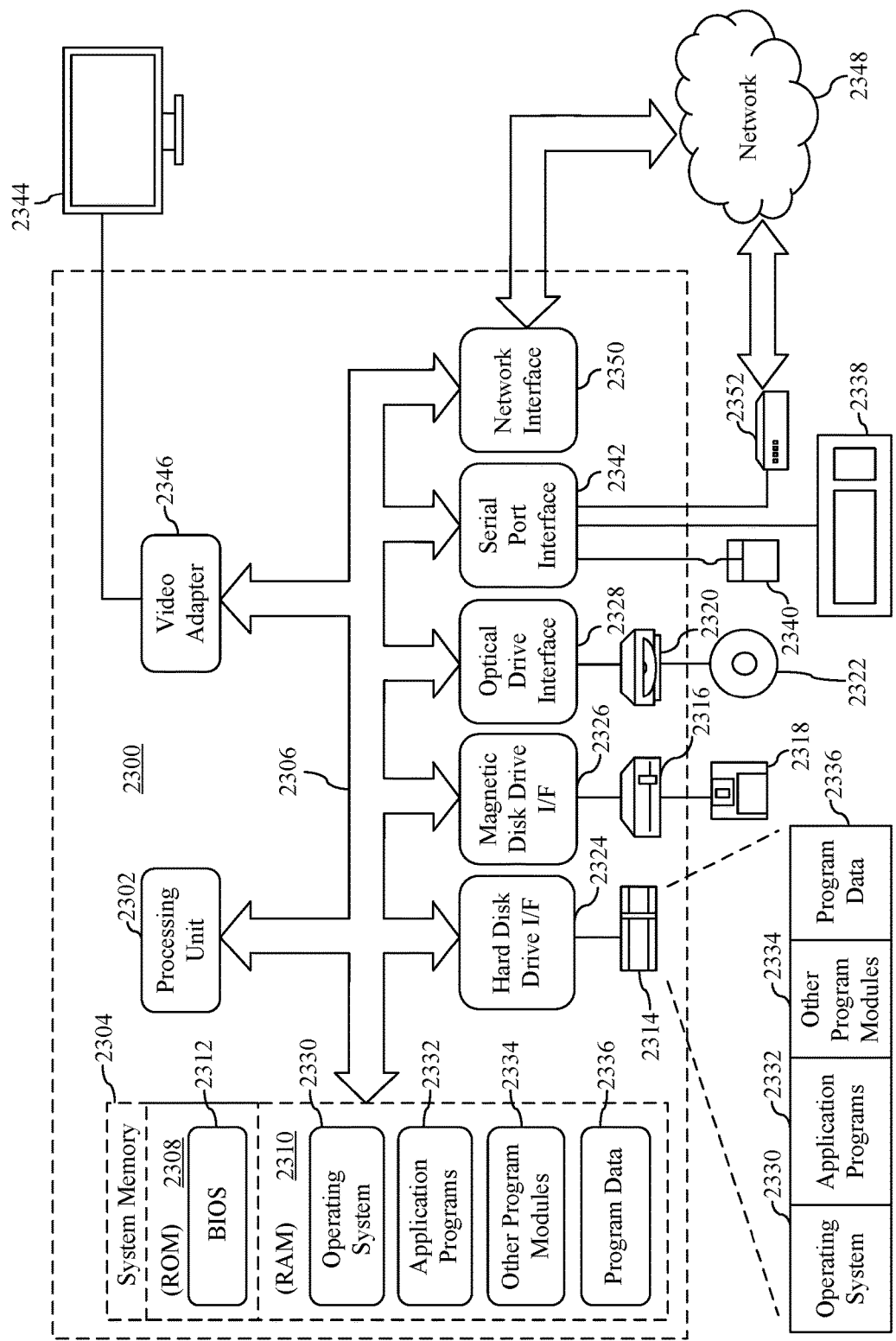
FIG. 23 is a block diagram of an example computing device that may be used to implement embodiments.

Furthermore, FIG. 23 depicts an exemplary implementation of a computing device 2300 in which embodiments may be implemented. For example, each of workflow designer 106, UI generator 110, workflow logic generator 112, workflow execution engine 906, pattern module 2030, and/or pattern generation module 2040 (and/or any of the components thereof) and/or any of the steps of flowcharts 200, 1000, 1600, 1700, 1800, and/or 1900 may be implemented in one or more computing devices similar to computing device 900 in stationary or mobile computer embodiments, including one or more features of computing device 900 and/or alternative features. The description of computing device 2300 provided herein is provided for purposes of illustration, and is not intended to be limiting. Embodiments may be implemented in further types of computer systems, as would be known to persons skilled in the relevant art(s).

As shown in FIG. 23, computing device 2300 includes one or more processors, referred to as processor circuit 2302, a system memory 2304, and a bus 2306 that couples various system components including system memory 2304 to processor circuit 2302. Processor circuit 2302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 2302 may execute program code stored in a computer readable medium, such as program code of operating system 2330, application programs 2332, other programs 2334, etc. Bus 2306 represents one or more of any of several types of bus structures, including a memory bus or memory controller, a peripheral bus, an accelerated graphics port, and a processor or local bus using any of a variety of bus architectures. System memory 2304 includes read only memory (ROM) 2308 and random access memory (RAM) 2310. A basic input/output system 2312 (BIOS) is stored in ROM 2308.

Computing device 2300 also has one or more of the following drives: a hard disk drive 2314 for reading from and writing to a hard disk, a magnetic disk drive 2316 for reading from or writing to a removable magnetic disk 2318, and an optical disk drive 2320 for reading from or writing to a removable optical disk 2322 such as a CD ROM, DVD ROM, or other optical media. Hard disk drive 2314, magnetic disk drive 2316, and optical disk drive 2320 are connected to bus 2306 by a hard disk drive interface 2324, a magnetic disk drive interface 2326, and an optical drive interface 2328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 2330, one or more application programs 2332, other programs 2334, and program data 2336. Application programs 2332 or other programs 2334 may include, for example, computer program logic (e.g., computer program code or instructions) for implementing the systems described above, including the workflow development and execution systems described in reference to FIGS. 1-21B.

A user may enter commands and information into the computing device 2300 through input devices such as keyboard 2338 and pointing device 2340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 2302 through a serial port interface 2342 that is coupled to bus 2306, but may be connected by other interfaces, such as a parallel port, game port, or a universal serial bus (USB).

A display screen 2344 is also connected to bus 2306 via an interface, such as a video adapter 2346. Display screen 2344 may be external to, or incorporated in computing device 2300. Display screen 2344 may display information, as well as being a user interface for receiving user commands and/or other information (e.g., by touch, finger gestures, virtual keyboard, etc.). In addition to display screen 2344, computing device 2300 may include other peripheral output devices (not shown) such as speakers and printers.

Computing device 2300 is connected to a network 2348 (e.g., the Internet) through an adaptor or network interface 2350, a modem 2352, or other means for establishing communications over the network. Modem 2352, which may be internal or external, may be connected to bus 2306 via serial port interface 2342, as shown in FIG. 23, or may be connected to bus 2306 using another interface type, including a parallel interface.

As used herein, the terms "computer program medium," "computer-readable medium," and "computer-readable storage medium" are used to generally refer to physical hardware media such as the hard disk associated with hard disk drive 2314, removable magnetic disk 2318, removable optical disk 2322, other physical hardware media such as RAMs, ROMs, flash memory cards, digital video disks, zip disks, MEMs, nanotechnology-based storage devices, and further types of physical/tangible hardware storage media (including system memory 2304 of FIG. 23). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 2332 and other programs 2334) may be stored on the hard disk, magnetic disk, optical disk, ROM, RAM, or other hardware storage medium. Such computer programs may also be received via network interface 2350, serial port interface 2352, or any other interface type. Such computer programs, when executed or loaded by an application, enable computing device 2300 to implement features of embodiments discussed herein. Accordingly, such computer programs represent controllers of the computing device 2300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system comprises: at least one processor circuit; and at least one memory that stores program code configured to be executed by the at least one processor circuit, the program code comprising: a workflow designer application that: receives, via a first data entry element of a first workflow step of a workflow displayed via a workflow designer graphical user interface (GUI) for the workflow designer application, input data that is in accordance with a first format utilized by a second workflow step that is previous to the first workflow step; receives, via a second data entry element of the first workflow step, example data that is in accordance with a second format that is different than the first format; automatically generates code that re-formats the input data into the second format; and applies the generated code to the first workflow step, the application of the generated code causing, during execution of the workflow, data that is received from the second workflow step to be automatically re-formatted in accordance with the second format.

In an implementation of the system, wherein the workflow designer application automatically generates the by: identifying one or more logical patterns that are common to the example data; and automatically generating the code based on the identified one or more logical patterns.

In an implementation of the system, the workflow designer application also displays the generated code via a GUI element associated with the first workflow step.

In an implementation of the system, the workflow designer application automatically generates the code by: detecting user input that activates a first GUI element associated with the first workflow step; and responsive to detecting the user input, automatically generating the code.

In an implementation of the system, the workflow designer application also enables the generated code to be tested via the first workflow step before applying the generated code to the first workflow step.

In an implementation of the system, the workflow designer application enables the generated code to be tested via the first workflow step before applying the generated code to the first workflow step by: responsive to detecting the user input: displaying a third data entry element associated with the first workflow step to receive test input data that is in accordance with the first format; and displaying a display element associated with the first workflow step to display output data representative of the test input data that has been re-formatted in accordance with the generated code.

In an implementation of the system, the display element displays the output data responsive to the workflow designer application detecting user input that activates a second GUI element associated with the first workflow step.

A computer-implemented method for developing and executing a workflow is described herein. The method includes: receiving, via a first data entry element of a first workflow step of a workflow displayed via a workflow designer graphical user interface (GUI) for a workflow designer application, input data that is in accordance with a first format utilized by a second workflow step that is previous to the first workflow step; receiving, via a second data entry element of the first workflow step, example data that is in accordance with a second format that is different than the first format; automatically generating code that re-formats the input data into the second format; and applying the generated code to the first workflow step, said applying causing, during execution of the workflow, data that is received from the second workflow step to be automatically re-formatted in accordance with the second format.

In an implementation of the method, automatically generating code that re-formats the input data into the second format comprises: identifying one or more logical patterns that are common to the example data; and automatically generating the code based on the identified one or more logical patterns.

In an implementation of the method, the method further comprises: displaying the generated code via a GUI element associated with the first workflow step.

In an implementation of the method, automatically generating code that re-formats the input data into the second format comprises: detecting user input that activates a first GUI element associated with the first workflow step; and responsive to detecting the user input, automatically generating the code responsive to detecting the user input.

In an implementation of the method, the method further comprises: enabling the generated code to be tested via the first workflow step before applying the generated code to the first workflow step.

In an implementation of the method, said enabling comprises: responsive to detecting the user input: displaying a third data entry element associated with the first workflow step to receive test input data that is in accordance with the first format; and displaying a display element associated with the first workflow step to display output data representative of the test input data that has been re-formatted in accordance with the generated code.

In an implementation of the method, the display element displays the output data responsive to detecting user input that activates a second GUI element associated with the first workflow step.

A computer-readable storage medium having program instructions recorded thereon that, when executed by a processor of a computing device, perform a method is further described herein. The method includes: receiving, via a first data entry element of a first workflow step of a workflow displayed via a workflow designer graphical user interface (GUI) for a workflow designer application, input data that is in accordance with a first format utilized by a second workflow step that is previous to the first workflow step; receiving, via a second data entry element of the first workflow step, example data that is in accordance with a second format that is different than the first format; automatically generating code that re-formats the input data into the second format; and applying the generated code to the first workflow step, said applying causing, during execution of the workflow, data that is received from the second workflow step to be automatically re-formatted in accordance with the second format.

In an implementation of the computer-readable storage medium, automatically generating code that is re-formats the input data into the second format comprises: identifying one or more logical patterns that are common to the example data; and automatically generating the code based on the identified one or more logical patterns.

In an implementation of the computer-readable storage medium, the method further comprising: displaying the generated code via a GUI element associated with the first workflow step.

In an implementation of the computer-readable storage medium, automatically generating code that re-formats the input data into the second format comprises: detecting user input that activates a first GUI element associated with the first workflow step; and responsive to detecting the user input, automatically generating the code.

In an implementation of the computer-readable storage medium, the method further comprises: enabling the generated code to be tested via the first workflow step before applying the generated code to the first workflow step.

In an implementation of the computer-readable storage medium, said enabling comprises: responsive to detecting the user input: displaying a third data entry element associated with the first workflow step to receive test input data that is in accordance with the first format; and displaying a display element associated with the first workflow step to display output data representative of the test input data that has been re-formatted in accordance with the generated code.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   at least one processor circuit; and
   at least one memory that stores program code to be executed by the at least one processor circuit, the program code comprising:
   a workflow designer application that:
      receives, via a first data entry element of a first workflow step of a workflow displayed via a workflow designer graphical user interface (GUI) for the workflow designer application, input data that is in accordance with a first format utilized by a second workflow step that is previous to the first workflow step;
      receives, via a second data entry element of the first workflow step, example data that is in accordance with a second format that is different than the first format;
      automatically generates code that re-formats the input data into the second format; and
      applies the generated code to the first workflow step, the application of the generated code causing, during execution of the workflow, data that is received from the second workflow step to be automatically re-formatted in accordance with the second format.

2. The system of claim 1, wherein the workflow designer application automatically generates the code by:
   identifying one or more logical patterns that are common to the example data; and
   automatically generating the code based on the identified one or more logical patterns.

3. The system of claim 1, wherein the workflow designer application also displays the generated code via a GUI element associated with the first workflow step.

4. The system of claim 3, wherein the workflow designer application automatically generates the code by:
   detecting user input that activates a first GUI element associated with the first workflow step; and
   responsive to detecting the user input, automatically generating the code.

5. The system of claim 4, wherein the workflow designer application also enables the generated code to be tested via the first workflow step before applying the generated code to the first workflow step.

6. The system of claim 5, wherein the workflow designer application enables the generated code to be tested via the first workflow step before applying the generated code to the first workflow step by:
   responsive to detecting the user input:
      displaying a third data entry element associated with the first workflow step to receive test input data that is in accordance with the first format; and
      displaying a display element associated with the first workflow step to display output data representative of the test input data that has been re-formatted in accordance with the generated code.

7. The system of claim 6, wherein the display element displays the output data responsive to the workflow designer application detecting user input that activates a second GUI element associated with the first workflow step.

8. A computer-implemented method for developing and executing a workflow, comprising:
   receiving, via a first data entry element of a first workflow step of a workflow displayed via a workflow designer graphical user interface (GUI) for a workflow designer application, input data that is in accordance with a first format utilized by a second workflow step that is previous to the first workflow step;
   receiving, via a second data entry element of the first workflow step, example data that is in accordance with a second format that is different than the first format;
   automatically generating code that re-formats the input data into the second format; and
   applying the generated code to the first workflow step, said applying causing, during execution of the workflow, data that is received from the second workflow step to be automatically re-formatted in accordance with the second format.

9. The computer-implemented method of claim 8, wherein automatically generating code that re-formats the input data into the second format comprises:
   identifying one or more logical patterns that are common to the example data; and
   automatically generating the code based on the identified one or more logical patterns.

10. The computer-implemented method of claim 8, further comprising:
    displaying the generated code via a GUI element associated with the first workflow step.

11. The computer-implemented method of claim 10, wherein automatically generating code that re-formats the input data into the second format comprises: detecting user input that activates a first GUI element associated with the first workflow step; and automatically generating the code responsive to detecting the user input.

12. The computer-implemented method of claim 11, further comprising:
    enabling the generated code to be tested via the first workflow step before applying the generated code to the first workflow step.

13. The computer-implemented method of claim 12, wherein said enabling comprises:
    responsive to detecting the user input:
       displaying a third data entry element associated with the first workflow step to receive test input data that is in accordance with the first format; and displaying a display element associated with the first workflow step to display output data representative of the test input data that has been re-formatted in accordance with the generated code.

14. The computer-implemented method of claim 13, wherein the display element displays the output data responsive to detecting user input that activates a second GUI element associated with the first workflow step.

15. A computer-readable storage medium having program instructions recorded thereon that, when executed by at least one processing circuit, perform a method, the method comprising:

receiving, via a first data entry element of a first workflow step of a workflow displayed via a workflow designer graphical user interface (GUI) for a workflow designer application, input data that is in accordance with a first format utilized by a second workflow step that is previous to the first workflow step;

receiving, via a second data entry element of the first workflow step, example data that is in accordance with a second format that is different than the first format;

automatically generating code that re-formats the input data into the second format; and applying the generated code to the first workflow step, said applying causing, during execution of the workflow, data that is received from the second workflow step to be automatically re-formatted in accordance with the second format.

16. The computer-readable storage medium of claim 15, wherein automatically generating code that re-formats the input data into the second format comprises:

identifying one or more logical patterns that are common to the example data; and automatically generating the code based on the identified one or more logical patterns.

17. The computer-readable storage medium of claim 15, the method further comprising:

displaying the generated code via a GUI element associated with the first workflow step.

18. The computer-readable storage medium of claim 17, wherein automatically generating code that re-formats the input data into the second format comprises:

detecting user input that activates a first GUI element associated with the first workflow step; and responsive to detecting the user input, automatically generating the code.

19. The computer-readable storage medium of claim 18, the method further comprising:

enabling the generated code to be tested via the first workflow step before applying the generated code to the first workflow step.

20. The computer-readable storage medium of claim 19, wherein said enabling comprises: responsive to detecting the user input: displaying a third data entry element associated with the first workflow step to receive test input data that is in accordance with the first format; and displaying a display element associated with the first workflow step to display output data representative of the test input data that has been re-formatted in accordance with the generated code.

* * * * *